United States Patent
Cabell et al.

(10) Patent No.: US 12,486,618 B2
(45) Date of Patent: *Dec. 2, 2025

(54) FIBROUS STRUCTURES DIFFERENT FIBROUS ELEMENTS

(71) Applicant: The Procter & Gamble Company, Cincinnati, OH (US)

(72) Inventors: David William Cabell, Cincinnati, OH (US); Michael Gomer Stelljes, Mason, OH (US); John Gerhard Michael, Cincinnati, OH (US); Janese Christine O'Brien Stickney, Wyoming, OH (US); Joshua Thomas Fung, Cincinnati, OH (US); Paul Arlen Forshey, Cincinnati, OH (US); Paul Dennis Trokhan, Hamilton, OH (US); Jeffrey Glen Sheehan, Symmes Township, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 11 days.

This patent is subject to a terminal disclaimer.

(21) Appl. No.: 15/478,382

(22) Filed: Apr. 4, 2017

(65) Prior Publication Data

US 2017/0284025 A1 Oct. 5, 2017

Related U.S. Application Data

(60) Provisional application No. 62/318,127, filed on Apr. 4, 2016.

(51) Int. Cl.
| | |
|---|---|
| *D21H 13/02* | (2006.01) |
| *A47K 10/16* | (2006.01) |
| *B32B 5/02* | (2006.01) |
| *B32B 7/04* | (2019.01) |

(Continued)

(52) U.S. Cl.
CPC .............. *D21H 13/02* (2013.01); *A47K 10/16* (2013.01); *B32B 5/022* (2013.01); *B32B 7/05* (2019.01);

(Continued)

(58) Field of Classification Search
CPC ......... B32B 29/02; B32B 5/022; B32B 7/045; B32B 3/28; B32B 29/06; B32B 2260/023;

(Continued)

(56) References Cited

U.S. PATENT DOCUMENTS

| | | |
|---|---|---|
| 3,546,056 A | 12/1970 | Thomas |
| 3,958,055 A | 5/1976 | Hadley et al. |

(Continued)

FOREIGN PATENT DOCUMENTS

| | | |
|---|---|---|
| DE | 10 2004 024 551 A1 | 12/2005 |
| EP | 097 036 A2 | 12/1983 |

(Continued)

OTHER PUBLICATIONS

U.S. Appl. No. 15/478,543, filed Apr. 4, 2017, Cabell, et al.

(Continued)

*Primary Examiner* — Jeremy R Pierce
(74) *Attorney, Agent, or Firm* — James E. Oehlenschlager

(57) ABSTRACT

Layered, and optionally dispersible fibrous structures containing fibrous elements that exhibit different physical characteristics, such as different average diameters as measured by the Average Diameter Test Method described herein, different surface characteristics, different lengths, different sources (naturally occurring versus non-naturally occurring and/or spun versus non-spun), sanitary tissue products employing such layered, optionally dispersible fibrous structures, and methods for making same are provided.

12 Claims, 10 Drawing Sheets

(51) Int. Cl.

| | |
|---|---|
| *B32B 7/05* | (2019.01) |
| *B32B 29/02* | (2006.01) |
| *B32B 29/06* | (2006.01) |
| *C08L 3/02* | (2006.01) |
| *D01D 5/098* | (2006.01) |
| *D01D 10/02* | (2006.01) |
| *D01D 10/06* | (2006.01) |
| *D01F 6/14* | (2006.01) |
| *D04H 3/007* | (2012.01) |
| *D04H 3/14* | (2012.01) |
| *D21H 11/04* | (2006.01) |
| *D21H 13/16* | (2006.01) |
| *D21H 13/30* | (2006.01) |
| *D21H 15/06* | (2006.01) |
| *D21H 27/00* | (2006.01) |
| *D21H 27/30* | (2006.01) |
| *D21H 27/38* | (2006.01) |
| *D21H 27/42* | (2006.01) |

(52) U.S. Cl.
CPC .............. *B32B 29/02* (2013.01); *B32B 29/06* (2013.01); *C08L 3/02* (2013.01); *D01D 5/0985* (2013.01); *D01D 10/02* (2013.01); *D01D 10/06* (2013.01); *D01F 6/14* (2013.01); *D04H 3/007* (2013.01); *D04H 3/14* (2013.01); *D21H 11/04* (2013.01); *D21H 13/16* (2013.01); *D21H 13/30* (2013.01); *D21H 15/06* (2013.01); *D21H 27/002* (2013.01); *D21H 27/004* (2013.01); *D21H 27/30* (2013.01); *D21H 27/38* (2013.01); *D21H 27/42* (2013.01); *B32B 2262/0223* (2013.01); *B32B 2262/067* (2013.01); *B32B 2555/00* (2013.01); *C08L 2205/025* (2013.01); *C08L 2205/03* (2013.01); *C08L 2205/16* (2013.01); *D10B 2509/00* (2013.01)

(58) Field of Classification Search
CPC ...... B32B 2262/067; B32B 2262/0223; B32B 2555/00; B32B 7/05; D01D 5/0985; D01D 10/02; D01D 10/06; D04H 3/007; D04H 3/14; D21H 13/02; D21H 27/002; D21H 27/30; D21H 13/16; D21H 15/06; D21H 13/30; D21H 11/04; D21H 27/38; D21H 27/42; C08L 3/02; D01F 6/14; A47K 10/16

See application file for complete search history.

(56) References Cited

U.S. PATENT DOCUMENTS

| | | | |
|---|---|---|---|
| 5,455,110 A | 10/1995 | Connor | |
| 5,804,281 A | 9/1998 | Phan et al. | |
| 5,830,558 A | 11/1998 | Barnholtz | |
| 5,865,824 A | 2/1999 | Chen et al. | |
| 5,885,516 A * | 3/1999 | Christensen | A61F 13/15658 |
| | | | 264/113 |
| 5,906,711 A | 5/1999 | Barnholtz | |
| 6,022,818 A | 2/2000 | Welchel et al. | |
| 6,060,149 A | 5/2000 | Nissing et al. | |
| 6,107,537 A | 8/2000 | Elder | |
| 6,110,848 A | 8/2000 | Bouchette | |
| 6,649,025 B2 | 11/2003 | Mills et al. | |
| 6,949,168 B2 | 9/2005 | Liu et al. | |
| 7,101,460 B2 | 9/2006 | Liu et al. | |
| 7,176,150 B2 | 2/2007 | Kopacz et al. | |
| 7,497,923 B2 | 3/2009 | Ward et al. | |
| RE40,724 E | 6/2009 | Barnholtz | |
| 7,799,959 B2 | 9/2010 | Ohno et al. | |
| 7,862,686 B2 | 1/2011 | Ward et al. | |
| 8,029,645 B2 | 10/2011 | Mohammadi | |
| 8,506,756 B2 | 8/2013 | Denis et al. | |
| 8,652,610 B2 | 2/2014 | Soerens et al. | |
| 8,771,466 B2 | 7/2014 | Denis et al. | |
| 9,296,176 B2 | 3/2016 | Escaffre et al. | |
| 2002/0099347 A1 | 7/2002 | Chen et al. | |
| 2002/0132548 A1 | 9/2002 | Ferreira et al. | |
| 2003/0019598 A1 | 1/2003 | Nakagawa et al. | |
| 2003/0102096 A1 | 6/2003 | Dwiggins et al. | |
| 2003/0211800 A1 | 11/2003 | Duncan et al. | |
| 2004/0111817 A1 | 6/2004 | Chen et al. | |
| 2004/0112558 A1 | 6/2004 | Garnier et al. | |
| 2004/0157524 A1 | 8/2004 | Polat | |
| 2004/0198114 A1* | 10/2004 | Barnholtz | D04H 1/587 |
| | | | 442/1 |
| 2004/0265534 A1 | 12/2004 | Curro et al. | |
| 2005/0003720 A1 | 1/2005 | Noelle | |
| 2005/0006043 A1* | 1/2005 | Vinson | D21H 17/71 |
| | | | 162/181.1 |
| 2005/0142973 A1 | 6/2005 | Bletsos et al. | |
| 2005/0148261 A1 | 7/2005 | Close et al. | |
| 2005/0281978 A1 | 12/2005 | Cabell | |
| 2006/0093788 A1 | 5/2006 | Behm et al. | |
| 2007/0039704 A1* | 2/2007 | Cabell | D06M 23/08 |
| | | | 162/157.2 |
| 2007/0044930 A1 | 3/2007 | Vinson et al. | |
| 2007/0232179 A1 | 10/2007 | Polat et al. | |
| 2007/0256802 A1 | 11/2007 | Sheehan et al. | |
| 2007/0298221 A1 | 12/2007 | Vinson | |
| 2008/0216975 A1* | 9/2008 | Farwig | B31F 1/07 |
| | | | 162/109 |
| 2009/0022983 A1 | 1/2009 | Cabell et al. | |
| 2009/0065436 A1 | 3/2009 | Kalayci et al. | |
| 2009/0169827 A1 | 7/2009 | Dharmadhikary et al. | |
| 2009/0255640 A1 | 10/2009 | Morin et al. | |
| 2009/0297781 A1 | 12/2009 | Huss et al. | |
| 2009/0311478 A1 | 12/2009 | Ehlerding et al. | |
| 2010/0048072 A1 | 2/2010 | Kauschke | |
| 2010/0136294 A1 | 6/2010 | Manifold et al. | |
| 2010/0155004 A1 | 6/2010 | Soerens et al. | |
| 2010/0247846 A1 | 9/2010 | Erickson | |
| 2011/0039074 A1 | 2/2011 | Cabell et al. | |
| 2011/0104444 A1 | 5/2011 | Barnholtz et al. | |
| 2011/0104970 A1 | 5/2011 | Barnholtz et al. | |
| 2011/0189435 A1 | 8/2011 | Manifold et al. | |
| 2011/0244199 A1* | 10/2011 | Brennan | D04H 3/015 |
| | | | 442/327 |
| 2012/0177888 A1 | 7/2012 | Escafere et al. | |
| 2012/0196124 A1 | 8/2012 | Mackey et al. | |
| 2013/0004552 A1 | 1/2013 | Pedoja | |
| 2013/0143001 A1 | 6/2013 | Manifold et al. | |
| 2013/0216789 A1 | 8/2013 | Kraus et al. | |
| 2013/0216809 A1 | 8/2013 | Cabell et al. | |
| 2013/0280503 A1 | 10/2013 | Cabell et al. | |
| 2013/0280508 A1 | 10/2013 | Heinzman et al. | |
| 2013/0302566 A1 | 11/2013 | Barnholtz et al. | |
| 2013/0319625 A1 | 12/2013 | Mohammadi et al. | |
| 2014/0138040 A1 | 5/2014 | Sartini et al. | |
| 2014/0242324 A1 | 8/2014 | Jones et al. | |
| 2015/0173571 A1 | 6/2015 | Maladen et al. | |
| 2015/0176220 A1 | 6/2015 | Ostendorf et al. | |
| 2016/0040337 A1 | 2/2016 | Dutkiewicz et al. | |
| 2017/0233616 A1 | 8/2017 | Moriwaki | |
| 2018/0320318 A1 | 11/2018 | Qin et al. | |

FOREIGN PATENT DOCUMENTS

| | | |
|---|---|---|
| GB | 1 242 572 A5 | 5/1968 |
| WO | WO 2010/021572 | 2/2001 |
| WO | WO 03057988 | 7/2003 |
| WO | 2011019908 A1 | 2/2011 |
| WO | 2011053956 A1 | 5/2011 |

OTHER PUBLICATIONS

U.S. Appl. No. 15/478,322, filed Apr. 4, 2017, Cabell, et al.
U.S. Appl. No. 15/478,326, filed Apr. 4, 2017, Cabell, et al.
U.S. Appl. No. 15/478,344, filed Apr. 4, 2017, Cabell, et al.

(56) References Cited

OTHER PUBLICATIONS

U.S. Appl. No. 15/478,357, filed Apr. 4, 2017, Cabell, et al.
U.S. Appl. No. 15/478,365, filed Apr. 4, 2017, Cabell, et al.
U.S. Appl. No. 15/478,372, filed Apr. 4, 2017, Cabell, et al.
U.S. Appl. No. 15/478,392, filed Apr. 4, 2017, Cabell, et al.
U.S. Appl. No. 15/478,402, filed Apr. 4, 2017, Cabell, et al.
U.S. Appl. No. 15/478,410, filed Apr. 4, 2017, Cabell, et al.
PCT International Search Report dated Jun. 14, 2017—5 pages.
PCT International Search Report dated Jun. 19, 2017—5 pages.
PCT International Search Report dated Jun. 26, 2017—6 pages.
PCT International Search Report dated Jun. 21, 2017—5 pages.
All Office Actions U.S. Appl. No. 15/478,543; U.S. Appl. No. 15/478,943; U.S. Appl. No. 15/478,326; U.S. Appl. No. 15/478,344; U.S. Appl. No. 15/478,357; U.S. Appl. No. 15/478,365; U.S. Appl. No. 15/478,372; U.S. Appl. No. 15/478,382; U.S. Appl. No. 15/478,392; U.S. Appl. No. 15/478,402; U.S. Appl. No. 15/478,410.
"What ingredients are in Charmin?" (Year: 2019).
Lexico, "Paper", https://www.lexico.com/en/definition/paper, accessed on Aug. 26, 2019. (Year: 2019).

* cited by examiner

FIBROUS STRUCTURES DIFFERENT FIBROUS ELEMENTS

FIELD OF THE INVENTION

The present invention relates to layered, and optionally dispersible fibrous structures, and more particularly to layered, and optionally dispersible fibrous structures comprising fibrous elements that exhibit different physical characteristics, such as different average diameters as measured by the Average Diameter Test Method described herein, different surface characteristics, different lengths, different sources (naturally occurring versus non-naturally occurring (spun) and/or spun versus non-spun), sanitary tissue products comprising such layered, and optionally dispersible fibrous structures, and methods for making same.

BACKGROUND OF THE INVENTION

Surface properties of fibrous structures, especially consumer fibrous structures, such as sanitary tissue products, for example toilet tissue, are very important to consumers of such fibrous structures.

If a fibrous structure's surface properties are considered too rough such that it doesn't glide on the skin sufficiently to keep from irritating the skin, then the fibrous structure exhibits consumer negatives for certain consumers of fibrous structures. An example of such a known fibrous structure is a commercially available cellulose pulp fiber-based, wet laid fibrous structure (web material), for example a very coarse, uncreped, through-air-dried wet laid fibrous structure.

Formulators have attempted to overcome the consumer negatives of such rough fibrous structures by applying surface chemistries to at least one surface of the rough fibrous structures. For example, formulators have applied lotions and/or silicones and/or quaternary ammonium compounds to try to improve the surface properties of the known fibrous structures. However, one problem with applying surface chemistries such as lotions and/or surface softening agents, such as silicones and/or quaternary ammonium compounds, is that such surface chemistries may reduce the surface properties too low and/or may transfer to the skin or other surface during use by the consumer, which leaves the consumer feeling like their skin or the other surface is not clean after use. This creates a consumer negative for certain consumers of fibrous structures. In addition, the current application of surface chemistries can create negatives, such as hygiene negatives and/or absorbency negatives, in the processing and/or manufacturing and/or use of the fibrous structure. An example such a known fibrous structure is a commercially available cellulose pulp fiber-based, lotioned, permanent wet strength agent-containing, wet laid fibrous structure, for example a lotioned facial tissue.

One problem that has not been addressed to date is the need for a fibrous structure that exhibits improved surface properties without the negatives associated with the current application of surface chemistries, such as lotions and/or surface softening agents, such as silicones and/or quaternary ammonium compounds.

Accordingly, there is a need for a fibrous structure that exhibits improved surface properties without the negatives associated with the current application of surface chemistries, such as lotions and/or surface softening agents, such as silicones and/or quaternary ammonium compounds, sanitary tissue products comprising such a fibrous structure, and a method for making such a fibrous structure.

SUMMARY OF THE INVENTION

The present invention fulfills the needs described above by providing a layered (as used herein "layered" in this context means the fibrous structure is not made up of separate plies of fibrous structures or web materials that are associated with one another to form a multi-ply fibrous structure, but rather is made up of a first web material upon which a surface material (not in the form of a pre-formed web material, but rather in the form of fibrous elements) is deposited, directly or indirectly, onto the first web material), and optionally dispersible (as used herein "dispersible" means aerobic biodisintegratable as measured according to EDANA FG505 Aerobic Biodisintegration Test) fibrous structure comprising a first web material such that the layered, and optionally dispersible fibrous structure exhibits improved surface properties compared to known fibrous structures comprising a first web material, such as a web of wood pulp fibers.

One solution to the problem identified above is to provide a layered, optionally dispersible fibrous structure that comprises a first layer comprising a plurality of non-naturally occurring, for example spun, fibrous elements, for example filaments, such as filaments that exhibit a length of 5.08 cm or greater and/or 7.62 cm (3 in.) or greater and/or 10.16 cm (4 in.) or greater and/or 15.24 cm (6 in.) or greater; and a second layer comprising a first web material, comprising a plurality of naturally occurring, for example non-spun, fibrous elements, for example fibers, such as fibers that exhibit a length of less than 5.08 cm and/or less than 3.81 cm (1.5 in.) and/or less than 2.54 cm (1 in.); wherein the first layer forms an exterior surface of the layered, and optionally dispersible fibrous structure such that the layered, and optionally dispersible fibrous structure exhibits improved surface properties compared to known fibrous structures comprising a first web material, such as a web of wood pulp fibers.

In one example of the present invention, a layered, and optionally dispersible fibrous structure comprising:

a. a first layer comprising non-naturally occurring and/or spun fibrous elements; and b. a second layer comprising naturally occurring and/or non spun fibrous elements, for example fibers, such as pulp fibers, for example wood pulp fibers, is provided.

In another example of the present invention, a layered, and optionally dispersible fibrous structure comprising:

a. a first layer comprising a plurality of first fibrous elements; and b. a second layer comprising a plurality of second fibrous elements; wherein at least one of the first and second layers is textured and wherein the first and second layers are not phase registered (as used herein "phase registered" means one or more elements, such as designs, surface patterns, or embossments, on the first layer is matched with or complements one or more elements, such as designs, surface patterns, or embossments, on the second layer), is provided.

In even another example of the present invention, a layered, and optionally dispersible fibrous structure comprising:

a. a first layer comprising a plurality of first fibrous elements;

b. a second layer comprising a paper web of second fibrous elements different from the first fibrous elements; and c. a third layer comprising a plurality of third fibrous elements;

wherein the second layer is positioned between the first and third layers, is provided.

In yet another example of the present invention, a layered, and optionally dispersible fibrous structure comprising:

a. a first layer comprising a plurality of first fibrous elements wherein the first layer comprises a non-undulating surface; and b. a second layer comprising a plurality of second fibrous elements wherein the second layer comprises an undulating surface, is provided.

In still yet another example of the present invention, a layered, and optionally dispersible fibrous structure comprising:

a. a first layer comprising a plurality of first fibrous elements comprising a first polymer; and b. a second layer comprising a plurality of second fibrous elements comprising a second polymer different from the first polymer, is provided.

In even yet another example of the present invention, a layered, and optionally dispersible fibrous structure comprising:

a. a first layer comprising a plurality of fibrous elements comprising a crosslinked polymer; and b. a second layer comprising a paper web;

wherein the first layer forms an exterior surface of the layered, and optionally dispersible fibrous structure, is provided.

The present invention provides a layered, and optionally dispersible fibrous structure that exhibits improved surface properties compared to known fibrous structures comprising a first web material, such as a web of wood pulp fibers, methods for making same, and sanitary tissue products comprising such layered, and optionally dispersible fibrous structures.

DETAILED DESCRIPTION OF THE INVENTION

Definitions

Figure 1:
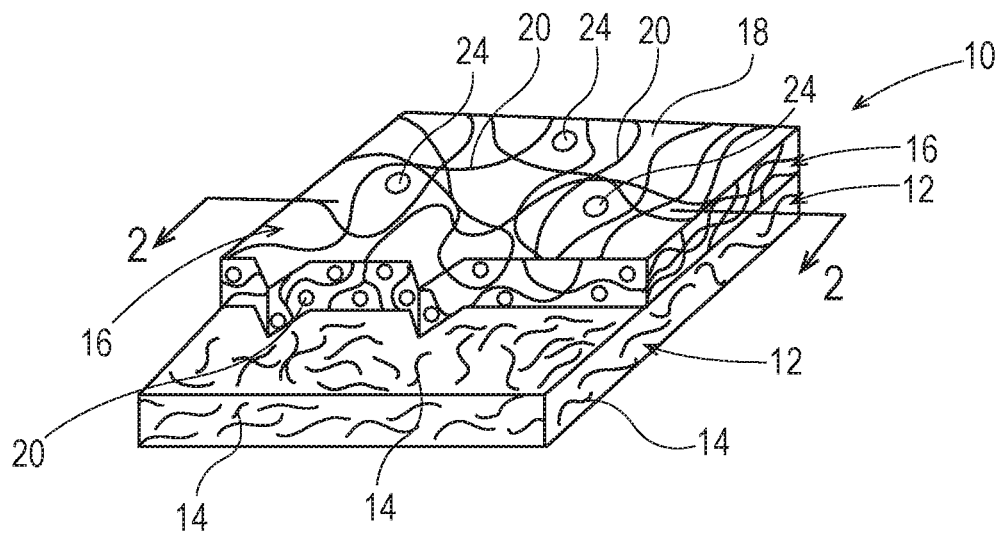
FIG. 1 is a schematic representation of an example of a fibrous structure according to the present invention.

"Fibrous element" as used herein means an elongate particulate having a length greatly exceeding its average diameter, i.e. a length to average diameter ratio of at least about 10. A fibrous element may be a filament or a fiber. In one example, the fibrous element is a single fibrous element rather than a yarn comprising a plurality of fibrous elements.

The fibrous elements of the present invention may be spun from polymer melt compositions via suitable spinning operations, such as meltblowing and/or spunbonding and/or they may be obtained from natural sources such as vegetative sources, for example trees.

The fibrous elements of the present invention may be monocomponent and/or multicomponent. For example, the fibrous elements may comprise bicomponent fibers and/or filaments. The bicomponent fibers and/or filaments may be in any form, such as side-by-side, core and sheath, islands-in-the-sea and the like.

"Filament" as used herein means an elongate particulate as described above that exhibits a length of greater than or equal to 5.08 cm (2 in.) and/or greater than or equal to 7.62 cm (3 in.) and/or greater than or equal to 10.16 cm (4 in.) and/or greater than or equal to 15.24 cm (6 in.).

Filaments are typically considered continuous or substantially continuous in nature. Filaments are relatively longer than fibers. Non-limiting examples of filaments include meltblown and/or spunbond filaments. Non-limiting examples of polymers that can be spun into filaments include natural polymers, such as starch, starch derivatives, cellulose, such as rayon and/or lyocell, and cellulose derivatives, hemicellulose, hemicellulose derivatives, and synthetic polymers including, but not limited to polyvinyl alcohol filaments and/or polyvinyl alcohol derivative filaments, and thermoplastic polymer filaments, such as polyesters, nylons, polyolefins such as polypropylene filaments, polyethylene filaments, and biodegradable or compostable thermoplastic fibers such as polylactic acid filaments, polyhydroxyalkanoate filaments, polyesteramide filaments, and polycaprolactone filaments. The filaments may be monocomponent or multicomponent, such as bicomponent filaments.

"Fiber" as used herein means an elongate particulate as described above that exhibits a length of less than 5.08 cm (2 in.) and/or less than 3.81 cm (1.5 in.) and/or less than 2.54 cm (1 in.).

Fibers are typically considered discontinuous in nature. Non-limiting examples of fibers include pulp fibers, such as wood pulp fibers, and synthetic staple fibers such as polypropylene, polyethylene, polyester, copolymers thereof, rayon, lyocell, glass fibers and polyvinyl alcohol fibers.

Staple fibers may be produced by spinning a filament tow and then cutting the tow into segments of less than 5.08 cm (2 in.) and/or less than 3.81 cm (1.5 in.) and/or less than 2.54 cm (1 in.) thus producing fibers; namely, staple fibers.

In one example of the present invention, a fiber may be a naturally occurring fiber, which means it is obtained from a naturally occurring source, such as a vegetative source, for example a tree and/or plant, such as trichomes. Such fibers are typically used in papermaking and are oftentimes referred to as papermaking fibers. Papermaking fibers useful in the present invention include cellulosic fibers commonly known as wood pulp fibers. Applicable wood pulps include chemical pulps, such as Kraft, sulfite, and sulfate pulps, as well as mechanical pulps including, for example, groundwood, thermomechanical pulp and chemically modified thermomechanical pulp. Chemical pulps, however, may be preferred since they impart a superior tactile sense of softness to fibrous structures made therefrom. Pulps derived from both deciduous trees (hereinafter, also referred to as "hardwood") and coniferous trees (hereinafter, also referred to as "softwood") may be utilized. The hardwood and softwood fibers can be blended, or alternatively, can be deposited in layers to provide a stratified web. Also applicable to the present invention are fibers derived from recycled paper, which may contain any or all of the above categories of fibers as well as other non-fibrous polymers such as fillers, softening agents, wet and dry strength agents, and adhesives used to facilitate the original papermaking.

In one example, the wood pulp fibers are selected from the group consisting of hardwood pulp fibers, softwood pulp fibers, and mixtures thereof. The hardwood pulp fibers may be selected from the group consisting of: tropical hardwood pulp fibers, northern hardwood pulp fibers, and mixtures thereof. The tropical hardwood pulp fibers may be selected from the group consisting of: eucalyptus fibers, acacia fibers, and mixtures thereof. The northern hardwood pulp fibers may be selected from the group consisting of: cedar fibers, maple fibers, and mixtures thereof.

In addition to the various wood pulp fibers, other cellulosic fibers such as cotton linters, rayon, lyocell, trichomes, seed hairs, and bagasse fibers can be used in this invention. Other sources of cellulose in the form of fibers or capable of being spun into fibers include grasses and grain sources.

"Trichome" or "trichome fiber" as used herein means an epidermal attachment of a varying shape, structure and/or function of a non-seed portion of a plant. In one example, a trichome is an outgrowth of the epidermis of a non-seed portion of a plant. The outgrowth may extend from an epidermal cell. In one embodiment, the outgrowth is a trichome fiber. The outgrowth may be a hairlike or bristle-like outgrowth from the epidermis of a plant.

Trichome fibers are different from seed hair fibers in that they are not attached to seed portions of a plant. For example, trichome fibers, unlike seed hair fibers, are not attached to a seed or a seed pod epidermis. Cotton, kapok, milkweed, and coconut coir are non-limiting examples of seed hair fibers.

Further, trichome fibers are different from nonwood bast and/or core fibers in that they are not attached to the bast, also known as phloem, or the core, also known as xylem portions of a nonwood dicotyledonous plant stem. Non-limiting examples of plants which have been used to yield nonwood bast fibers and/or nonwood core fibers include kenaf, jute, flax, ramie and hemp.

Further trichome fibers are different from monocotyledonous plant derived fibers such as those derived from cereal straws (wheat, rye, barley, oat, etc), stalks (corn, cotton, sorghum, *Hesperaloe funifera*, etc.), canes (bamboo, bagasse, etc.), grasses (esparto, lemon, sabai, switchgrass, etc), since such monocotyledonous plant derived fibers are not attached to an epidermis of a plant.

Further, trichome fibers are different from leaf fibers in that they do not originate from within the leaf structure. Sisal and abaca are sometimes liberated as leaf fibers.

Finally, trichome fibers are different from wood pulp fibers since wood pulp fibers are not outgrowths from the epidermis of a plant; namely, a tree. Wood pulp fibers rather originate from the secondary xylem portion of the tree stem.

"Fibrous structure" as used herein means a structure that comprises a first web material comprising a plurality of fibrous elements, for example a plurality of fibers, such as a plurality of pulp fibers. In one example, the first web may comprise a plurality of wood pulp fibers. In another example, the first web material may comprise a plurality of non-wood pulp fibers, for example plant fibers, synthetic staple fibers, and mixtures thereof. In still another example, in addition to fibers, such as pulp fibers, the first web material may comprise a plurality of filaments, such as polymeric filaments, for example thermoplastic filaments such as polyolefin filaments (i.e., polypropylene filaments), thermoplastic polyvinyl alcohol filaments, and/or hydroxyl polymer filaments, for example polyvinyl alcohol filaments and/or polysaccharide filaments such as starch filaments, such as in the form of a coform web material where the fibers and filaments are commingled together and/or are present as discrete or substantially discrete layers within the first web material. In one example, a web material, for example a first web material, according to the present invention means an orderly arrangement of fibers and/or with filaments within a structure in order to perform a function. In one example, a fibrous structure according to the present invention means an association of fibrous elements that together form a structure capable of performing a function. In another example of the present invention, a fibrous structure comprises a plurality of inter-entangled fibrous elements, for example inter-entangled filaments. Non-limiting examples of web materials of the present invention include paper.

Non-limiting examples of processes for making a web material, for example a first web material of the fibrous structures of the present invention include known wet-laid papermaking processes, for example conventional wet-pressed (CWP) papermaking processes and through-air-dried (TAD), both creped TAD and uncreped TAD, papermaking processes, and air-laid papermaking processes. Such processes typically include steps of preparing a fiber composition in the form of a fiber suspension in a medium, either wet, more specifically aqueous medium, or dry, more specifically gaseous, i.e. with air as medium. The aqueous medium used for wet-laid processes is oftentimes referred to as a fiber slurry. The fiber slurry is then used to deposit a plurality of the fibers onto a forming wire, fabric, or belt such that an embryonic web material is formed, after which drying and/or bonding the fibers together results in a web material, for example the first web material. Further processing of the first web material may be carried out such that a finished first web material is formed. For example, in typical papermaking processes, the finished first web material is the web material that is wound on the reel at the end of papermaking, often referred to as a parent roll, and may subsequently be converted into a finished fibrous structure of the present invention, e.g. a single- or multi-ply fibrous structure and/or a single- or multi-ply sanitary tissue product.

In another example, the web material, for example the first web material is a coformed web material comprising a plurality of filaments and a plurality of fibers commingled together as a result of a coforming process.

"Basis Weight" as used herein is the weight per unit area of a sample reported in lbs/3000 ft$^2$ or g/m$^2$ (gsm) and is measured according to the Basis Weight Test Method described herein.

"Machine Direction" or "MD" as used herein means the direction parallel to the flow of the fibrous structure through a fibrous structure making machine and/or sanitary tissue product manufacturing equipment. Typically, the MD is substantially perpendicular to any perforations present in the fibrous structure "Cross Machine Direction" or "CD" as used herein means the direction parallel to the width of the fibrous structure making machine and/or sanitary tissue product manufacturing equipment and perpendicular to the machine direction in the same plane.

"Ply" or "Plies" as used herein means an individual fibrous structure optionally to be disposed in a substantially contiguous, face-to-face relationship with other plies, forming a multiple ply fibrous structure. It is also contemplated that a single fibrous structure can effectively form two "plies" or multiple "plies", for example, by being folded on itself "Embossed" as used herein with respect to a web material, a fibrous structure, and/or a sanitary tissue product means that a web material, a fibrous structure, and/or a sanitary tissue product has been subjected to a process which converts a smooth surfaced web material, fibrous structure, and/or sanitary tissue product to a decorative surface by replicating a design on one or more emboss rolls, which form a nip through which the web material, fibrous structure, and/or sanitary tissue product passes. Embossed does not include creping, microcreping, printing or other processes that may also impart a texture and/or decorative pattern to a web material, a fibrous structure, and/or a sanitary tissue product.

"Differential density", as used herein, means a web material that comprises one or more regions of relatively low fiber density, which are referred to as pillow regions, and one or more regions of relatively high fiber density, which are referred to as knuckle regions.

"Densified", as used herein means a portion of a fibrous structure and/or sanitary tissue product that is characterized by regions of relatively high fiber density (knuckle regions).

"Non-densified", as used herein, means a portion of a fibrous structure and/or sanitary tissue product that exhibits a lesser density (one or more regions of relatively lower fiber density) (pillow regions) than another portion (for example a knuckle region) of the fibrous structure and/or sanitary tissue product.

"Non-rolled" as used herein with respect to a fibrous structure and/or sanitary tissue product of the present invention means that the fibrous structure and/or sanitary tissue product is an individual sheet (for example not connected to adjacent sheets by perforation lines. However, two or more individual sheets may be interleaved with one another) that is not convolutedly wound about a core or itself. For example, a non-rolled product comprises a facial tissue.

"Creped" as used herein means creped off of a Yankee dryer or other similar roll and/or fabric creped and/or belt creped. Rush transfer of a fibrous structure alone does not result in a "creped" fibrous structure or "creped" sanitary tissue product for purposes of the present invention.

"Sanitary tissue product" as used herein means a soft, relatively low density fibrous structure useful as a wiping implement for post-urinary and post-bowel movement cleaning (toilet tissue), for otorhinolaryngological discharges (facial tissue), multi-functional absorbent and cleaning uses (absorbent towels) and wipes, such as wet and dry wipes. The sanitary tissue product may be convolutedly wound upon itself about a core or without a core to form a sanitary tissue product roll or may be in the form of discrete sheets.

In one example, the sanitary tissue product of the present invention comprises one or more fibrous structures according to the present invention.

The sanitary tissue products and/or fibrous structures of the present invention may exhibit a basis weight between about 1 g/m$^2$ to about 5000 g/m$^2$ and/or from about 10 g/m$^2$ to about 500 g/m$^2$ and/or from about 10 g/m$^2$ to about 300 g/m$^2$ and/or from about 10 g/m$^2$ to about 120 g/m$^2$ and/or from about 15 g/m$^2$ to about 110 g/m$^2$ and/or from about 20 g/m$^2$ to about 100 g/m$^2$ and/or from about 30 to 90 g/m$^2$ as determined by the Basis Weight Test Method described herein. In addition, the sanitary tissue product of the present invention may exhibit a basis weight between about 40 g/m$^2$ to about 120 g/m$^2$ and/or from about 50 g/m$^2$ to about 110 g/m$^2$ and/or from about 55 g/m$^2$ to about 105 g/m$^2$ and/or from about 60 g/m$^2$ to 100 g/m$^2$ as determined by the Basis Weight Test Method described herein.

The sanitary tissue products of the present invention may exhibit a total dry tensile strength of greater than about 59 g/cm and/or from about 78 g/cm to about 394 g/cm and/or from about 98 g/cm to about 335 g/cm. In addition, the sanitary tissue product of the present invention may exhibit a total dry tensile strength of greater than about 196 g/cm and/or from about 196 g/cm to about 394 g/cm and/or from about 216 g/cm to about 335 g/cm and/or from about 236 g/cm to about 315 g/cm. In one example, the sanitary tissue product exhibits a total dry tensile strength of less than about 394 g/cm and/or less than about 335 g/cm.

The sanitary tissue products of the present invention may exhibit a density of less than 0.60 g/cm$^3$ and/or less than 0.30 g/cm$^3$ and/or less than 0.20 g/cm$^3$ and/or less than 0.15 g/cm$^3$ and/or less than 0.10 g/cm$^3$ and/or less than 0.07 g/cm$^3$ and/or less than 0.05 g/cm$^3$ and/or from about 0.01 g/cm$^3$ to about 0.20 g/cm$^3$ and/or from about 0.02 g/cm$^3$ to about 0.15 g/cm$^3$ and/or from about 0.02 g/cm$^3$ to about 0.10 g/cm$^3$.

The sanitary tissue products of the present invention may be in the form of sanitary tissue product rolls. Such sanitary tissue product rolls may comprise a plurality of connected, but perforated sheets of fibrous structure, that are separably dispensable from adjacent sheets.

The sanitary tissue products of the present invention may comprise additives such as softening agents, temporary wet strength agents, permanent wet strength agents, bulk softening agents, lotions, silicones, wetting agents, latexes, patterned latexes and other types of additives suitable for inclusion in and/or on sanitary tissue products.

"Hydroxyl polymer" as used herein includes any hydroxyl-containing polymer that can be incorporated into a filament of the present invention. In one example, the hydroxyl polymer of the present invention includes greater than 10% and/or greater than 20% and/or greater than 25% by weight hydroxyl moieties. In another example, the hydroxyl within the hydroxyl-containing polymer is not part of a larger functional group such as a carboxylic acid group.

"Non-thermoplastic" as used herein means, with respect to a material, such as a fibrous element as a whole and/or a polymer, such as a crosslinked polymer, within a fibrous element, that the fibrous element and/or polymer exhibits no melting point and/or softening point, which allows it to flow under pressure, in the absence of a plasticizer, such as water, glycerin, sorbitol, urea and the like.

"Non-cellulose-containing" as used herein means that less than 5% and/or less than 3% and/or less than 1% and/or less than 0.1% and/or 0% by weight of cellulose polymer, cellulose derivative polymer and/or cellulose copolymer is present in fibrous element. In one example, "non-cellulose-containing" means that less than 5% and/or less than 3% and/or less than 1% and/or less than 0.1% and/or 0% by weight of cellulose polymer is present in fibrous element.

"Crosslinking facilitator" and/or "crosslinking facilitator function" as used herein means any material that is capable of activating a crosslinking agent thereby transforming the crosslinking agent from its unactivated state to its activated state.

"Fast wetting surfactant" and/or "fast wetting surfactant component" and/or "fast wetting surfactant function" as used herein means a surfactant and/or surfactant component, such as an ion from a fast wetting surfactant, for example a sulfosuccinate diester ion (anion), that exhibits a Critical Micelle Concentration (CMC) of greater 0.15% by weight and/or at least 0.25% and/or at least 0.50% and/or at least 0.75% and/or at least 1.0% and/or at least 1.25% and/or at least 1.4% and/or less than 10.0% and/or less than 7.0% and/or less than 4.0% and/or less than 3.0% and/or less than 2.0% by weight.

"Polymer melt composition" or "Polysaccharide melt composition" as used herein means a composition comprising water and a melt processed polymer, such as a melt processed fibrous element-forming polymer, for example a melt processed hydroxyl polymer, such as a melt processed polysaccharide.

"Melt processed fibrous element-forming polymer" as used herein means any polymer, which by influence of elevated temperatures, pressure and/or external plasticizers may be softened to such a degree that it can be brought into a flowable state, and in this condition may be shaped as desired.

"Melt processed hydroxyl polymer" as used herein means any polymer that contains greater than 10% and/or greater than 20% and/or greater than 25% by weight hydroxyl groups and that has been melt processed, with or without the aid of an external plasticizer. More generally, melt processed hydroxyl polymers include polymers, which by the influence of elevated temperatures, pressure and/or external plasticizers may be softened to such a degree that they can be brought into a flowable state, and in this condition may be shaped as desired.

"Blend" as used herein means that two or more materials, such as a fibrous element-forming polymer, for example a hydroxyl polymer and a polyacrylamide are in contact with each other, such as mixed together homogeneously or non-homogeneously, within a filament. In other words, a filament formed from one material, but having an exterior coating of another material is not a blend of materials for purposes of the present invention. However, a fibrous element formed from two different materials is a blend of materials for purposes of the present invention even if the fibrous element further comprises an exterior coating of a material.

"Associate," "Associated," "Association," and/or "Associating" as used herein with respect to fibrous elements and/or with respect to a surface and/or surface material being associated with a fibrous structure and/or a first web material means combining, either in direct contact or in indirect contact, fibrous elements and/or a surface material with a first web material such that a fibrous structure is formed. In one example, the associated fibrous elements and/or associated surface material may be bonded to the first web material, directly or indirectly, for example by adhesives and/or thermal bonds to form adhesive sites and/or thermal bond sites, respectively, within the fibrous structure. In another example, the fibrous elements and/or surface material may be associated with the first web material, directly or indirectly, by being deposited onto the same first web material making belt.

"Average Diameter" as used herein, with respect to a fibrous element, is measured according to the Average Diameter Test Method described herein. In one example, a fibrous element of the present invention exhibits an average diameter of less than 50 µm and/or less than 25 µm and/or less than 20 µm and/or less than 15 µm and/or less than 10 µm and/or less than 6 µm and/or greater than 1 µm and/or greater than 3 µm.

"3D pattern" with respect to a fibrous structure and/or sanitary tissue product's surface in accordance with the present invention means herein a pattern that is present on at least one surface of the fibrous structure and/or sanitary tissue product. The 3D pattern texturizes the surface of the fibrous structure and/or sanitary tissue product, for example by providing the surface with protrusions and/or depressions. The 3D pattern on the surface of the fibrous structure and/or sanitary tissue product is made by making the sanitary tissue product or at least one fibrous structure ply employed in the sanitary tissue product on a patterned molding member that imparts the 3D pattern to the sanitary tissue products and/or fibrous structure plies made thereon. For example, the 3D pattern may comprise a series of line elements, such as a series of line elements that are substantially oriented in the cross-machine direction of the fibrous structure and/or sanitary tissue product.

In one example, a series of line elements may be arranged in a 3D pattern selected from the group consisting of: periodic patterns, aperiodic patterns, straight line patterns, curved line patterns, wavy line patterns, snaking patterns, square line patterns, triangular line patterns, S-wave patterns, sinusoidal line patterns, and mixtures thereof. In another example, a series of line elements may be arranged in a regular periodic pattern or an irregular periodic pattern (aperiodic) or a non-periodic pattern.

"Line element" as used herein means a portion of a fibrous structure's surface being in the shape of a line, which may be continuous, discrete, interrupted, and/or partial line with respect to a fibrous structure on which it is present. The line element may be of any suitable shape such as straight, bent, kinked, curled, curvilinear, serpentine, sinusoidal and mixtures thereof, that may form regular or irregular periodic or non-periodic lattice work of structures wherein the line element exhibits a length along its path of at least 2 mm and/or at least 4 mm and/or at least 6 mm and/or at least 1 cm to about 30 cm and/or to about 27 cm and/or to about 20 cm and/or to about 15 cm and/or to about 10.16 cm and/or to about 8 cm and/or to about 6 cm and/or to about 4 cm. In one example, the line element may comprise a plurality of discrete elements, such as dots and/or dashes for example, that are oriented together to form a line element of the present invention. In another example, the line element may comprise a combination of line segments and discrete elements, such as dots and/or dashes for example, that are oriented together to form a line element of the present invention. In another example, the line element may be formed by a plurality of discrete shapes that together form a line element. In one example, the line element may comprise discrete shapes selected from the group consisting of: dots, dashes, triangles, squares, ellipses, and mixtures thereof.

The line element may exhibit an aspect ratio (the ratio of length of line element orthogonal to the direction of the design (pattern) to the line element's length parallel to the direction of the design (pattern)) of greater than 1.5:1 and/or greater than 1.75:1 and/or greater than 2:1 and/or greater than 5:1 along the path of the line element. In one example, the line element exhibits a length along its path of at least 2 mm and/or at least 4 mm and/or at least 6 mm and/or at least 1 cm to about 30 cm and/or to about 27 cm and/or to about 20 cm and/or to about 15 cm and/or to about 10.16 cm and/or to about 8 cm and/or to about 6 cm and/or to about 4 cm.

Different line elements may exhibit different common intensive properties. For example, different line elements may exhibit different densities and/or basis weights. In one example, the common intensive property is selected from the group consisting of: density, basis weight, elevation, opacity, crepe frequency, and combinations thereof. In one example the common intensive property is density. In another example, the common intensive property is elevation. In one example, a fibrous structure of the present invention comprises a first series of line elements and a second series of line elements. For example, the line elements of the first series of line elements may exhibit the same densities, which are lower than the densities of the line elements of the second series of line elements. In another example, the line elements of the first series of line elements may exhibit the same elevations, which are higher than the elevations of the line elements of the second series of line elements. In another example, the line elements of the first series of line elements may exhibit the same basis weights, which are lower than the basis weights of the line elements of the second series of line elements.

In one example, the line element is a straight or substantially straight line element. In another example, the line element is a curvilinear line element, such as a sinusoidal line element. Unless otherwise stated, the line elements of the present invention are present on a surface of a fibrous structure In one example, the line element and/or line element forming component is continuous or substantially continuous within a fibrous structure, for example in one case one or more 11 cm×11 cm sheets of fibrous structure.

The line elements may exhibit different widths along their lengths of their paths, between two or more different line elements and/or the line elements may exhibit different lengths. Different line elements may exhibit different widths and/or lengths along their respective paths.

In one example, the surface pattern of the present invention comprises a plurality of parallel line elements. The plurality of parallel line elements may be a series of parallel line elements. In one example, the plurality of parallel line elements may comprise a plurality of parallel sinusoidal line elements.

In one example, the line elements of the present invention may comprise wet texture, such as being formed by wet molding and/or through-air-drying via a fabric and/or an imprinted through-air-drying fabric. In one example, the wet texture line elements are water-resistant.

"Water-resistant" as it refers to a surface pattern or part thereof means that a line element and/or pattern comprising the line element retains its structure and/or integrity after being saturated by water and the line element and/or pattern is still visible to a consumer. In one example, the line elements and/or pattern may be water-resistant.

"Discrete" as it refers to a line element means that a line element has at least one immediate adjacent region of the fibrous structure that is different from the line element. In one example, a plurality of parallel line elements are discrete and/or separated from adjacent parallel line elements by a channel. The channel may exhibit a complementary shape to the parallel line elements. In other words, if the plurality of parallel line elements are straight lines, then the channels separating the parallel line elements would be straight. Likewise, if the plurality of parallel line elements are sinusoidal lines, then the channels separating the parallel line elements would be sinusoidal. The channels may exhibit the same widths and/or lengths as the line elements.

"Machine direction oriented" as it refers to a line element a line element means that the line element has a primary direction that is at an angle of less than 45° and/or less than 30° and/or less than 15° and/or less than 5° and/or to about 0° with respect to the machine direction of the 3D patterned fibrous structure ply and/or sanitary tissue product comprising the 3D patterned fibrous structure ply.

"Substantially cross machine direction oriented" as it refers to a line element and/or series of line elements means that the line element and/or series of line elements has a primary direction that is at an angle of less than 20° and/or less than 15° and/or less than 10° and/or less than 5° and/or to about 0° with respect to the cross-machine direction of the 3D patterned fibrous structure ply and/or sanitary tissue product comprising the 3D patterned fibrous structure ply. In one example, the line element and/or series of line elements has a primary direction that is an angle of from about 5° to about 0° and/or from about 3° to about 0° with respect to the cross-machine direction of the 3D patterned fibrous structure ply and/or sanitary tissue product comprising the 3D patterned fibrous structure ply.

"Wet textured" as used herein means that a 3D patterned fibrous structure ply comprises texture (for example a three-dimensional topography) imparted to the fibrous structure and/or fibrous structure's surface during a fibrous structure making process. In one example, in a wet-laid fibrous structure making process, wet texture can be imparted to a fibrous structure upon fibers and/or filaments being collected on a collection device that has a three-dimensional (3D) surface which imparts a 3D surface to the fibrous structure being formed thereon and/or being transferred to a fabric and/or belt, such as a through-air-drying fabric and/or a patterned drying belt, comprising a 3D surface that imparts a 3D surface to a fibrous structure being formed thereon. In one example, the collection device with a 3D surface comprises a patterned, such as a patterned formed by a polymer or resin being deposited onto a base substrate, such as a fabric, in a patterned configuration. The wet texture imparted to a wet-laid fibrous structure is formed in the fibrous structure prior to and/or during drying of the fibrous structure. Non-limiting examples of collection devices and/or fabric and/or belts suitable for imparting wet texture to a fibrous structure include those fabrics and/or belts used in fabric creping and/or belt creping processes, for example as disclosed in U.S. Pat. Nos. 7,820,008 and 7,789,995, coarse through-air-drying fabrics as used in uncreped through-air-drying processes, and photo-curable resin patterned through-air-drying belts, for example as disclosed in U.S. Pat. No. 4,637,859. For purposes of the present invention, the collection devices used for imparting wet texture to the fibrous structures would be patterned to result in the fibrous structures comprising a surface pattern comprising a plurality of parallel line elements wherein at least one, two, three, or more, for example all of the parallel line elements exhibit a non-constant width along the length of the parallel line elements. This is different from non-wet texture that is imparted to a fibrous structure after the fibrous structure has been dried, for example after the moisture level of the fibrous structure is less than 15% and/or less than 10% and/or less than 5%. An example of non-wet texture includes embossments imparted to a fibrous structure by embossing rolls during converting of the fibrous structure.

As used herein, the articles "a" and "an" when used herein, for example, "an anionic surfactant" or "a fiber" is understood to mean one or more of the material that is claimed or described.

All percentages and ratios are calculated by weight unless otherwise indicated. All percentages and ratios are calculated based on the total composition unless otherwise indicated.

Unless otherwise noted, all component or composition levels are in reference to the active level of that component or composition, and are exclusive of impurities, for example, residual solvents or by-products, which may be present in commercially available sources.

Fibrous Structures

Figure 2:
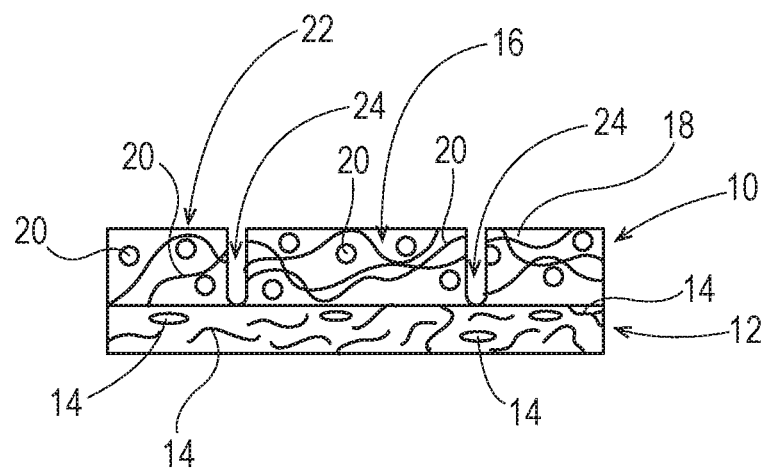
FIG. 2 is a cross-sectional view of FIG. 1 taken along line 2-2.

In one example of the present invention as shown in FIGS. 1 and 2, a fibrous structure 10, which may be a layered, and optionally dispersible fibrous structure comprising a first layer and a second layer, of the present invention comprises a first web material 12, which may form a second layer in a layered, and optionally dispersible fibrous structure according to the present invention, comprising a plurality of fibrous elements, for example fibers 14, and a surface material 16, for example a second web material 18 comprising a plurality of fibrous elements, for example spun fibrous elements and/or non-naturally occurring fibrous elements, such as filaments 20, for example hydroxyl polymer filaments, which may form a first layer in a layered, and optionally dispersible fibrous structure according to the present invention, such that the fibrous structure exhibits a improved surface properties compared to known fibrous structures, for example known sanitary tissue products, such as known toilet tissue products and/or known skin-wiping fibrous structure products, comprising a first web material, such as a web of wood pulp fibers.

In one example, the fibrous structure of the present invention is a layered, and optionally dispersible fibrous structure, for example a layered, optionally dispersible fibrous structure comprising a first layer comprising a plurality of spun and/or non-naturally occurring fibrous elements, for example a plurality of filaments that exhibit a length of 5.08 cm or greater and/or 7.62 cm or greater and/or 10.16 cm or greater and/or 15.24 cm or greater, and a second layer comprising a first web material comprising a plurality of naturally-occurring fibrous elements, for example fibers, such as pulp fibers that exhibit a length of less than 5.08 cm and/or less than 3.81 cm and/or less than 3 cm and/or less than 2.54 cm and/or less than 1 cm and/or less than 8 mm and/or less than 5 mm.

In one example, the surface material 16 comprises a plurality of fibers and/or filaments that are deposited onto the first web material 12 in a layered configuration. The surface material 16 may be in the form of a second web material 18 after being deposited onto the first web material 12.

In another example, the surface material 16 comprises a pre-formed second web material 18 that is associated with a first web material 12 in a multi-ply configuration.

In one example, a surface 22 of the surface material 16 may be a consumer-contacting surface such that during use of the fibrous structure 10 the consumer wipes the surface 22 of the surface material 16, such as the second web material 18, across the skin of the consumer or another person, such as the consumer's child. One of the benefits of the fibrous structure 10 is that it exhibits improved glide on skin properties, such as improved force variability (less than 1.40) and/or force to drag (less than 100) as measured according to the Glide On Skin Test Method described herein.

In one example, the surface material 16, for example second web material 18, may be associated with the first web material 12 by bonding, such as thermal bond sites 24 and/or adhesive bond sites (not shown).

Figure 3:
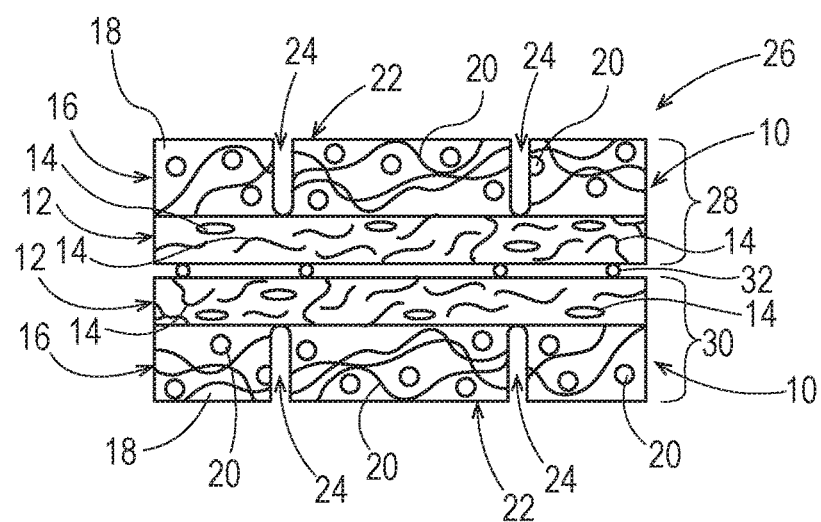
FIG. 3 is a schematic cross-sectional representation of an example of a multi-ply fibrous structure according to the present invention.

As shown in FIG. 3, in one example a multi-ply fibrous structure 26 may comprise a first fibrous structure ply 28 and a second fibrous structure ply 30 wherein at least one of the first and second fibrous structure plies 28, 30 is a fibrous structure 10 according to the present invention. In this case, both the first and second fibrous structure plies 28, 30 are fibrous structures 10 according to the present invention. The first and second fibrous structure plies 28, 30 may be associated with one another by bonding, such as thermal bond sites and/or adhesive bond sites 32 as shown. The first and second fibrous structure plies 28, 30 are associated with one another such that the surface material 16 of both the first and second fibrous structure plies 28, 30 form exterior surfaces of the multi-ply fibrous structure 26 and the first web material 12 of both the first and second fibrous structure plies 28, 30 form inner web materials within the multi-ply fibrous structure 26.

In one example, the multi-ply fibrous structure 26 according to the present invention may comprise a first fibrous structure ply 28 and a second fibrous structure ply 30, which may be glued together by adhesive bond sites 32 to form the multi-ply fibrous structure 26. The first fibrous structure ply 28 comprises an exterior layer, the surface material 16, for example the second web material 18, comprising a plurality of fibrous elements, for example a plurality of filaments 20, such as hydroxyl polymer filaments, for example starch and/or starch derivative filaments, present at a level of greater than 6 and/or greater than 8 and/or greater than 10 and/or greater than 12 and/or greater than 14 and/or greater than 16 and/or at least 18 and/or less than 40 and/or less than 35 and/or less than 30 and/or less than 25 gsm, and an additional layer, the first web material 12, which comprises a plurality of fibrous elements, for example a plurality of fibers, such as pulp fibers, for example wood pulp fibers, present at a level of greater than 6 and/or greater than 8 and/or greater than greater than 10 and/or greater than 12 and/or greater than 14 and/or greater than 16 and/or at least 18 and/or less than 55 and/or less than 50 and/or less than 40 and/or less than 35 and/or less than 30 and/or less than 25 gsm.

Figure 4:
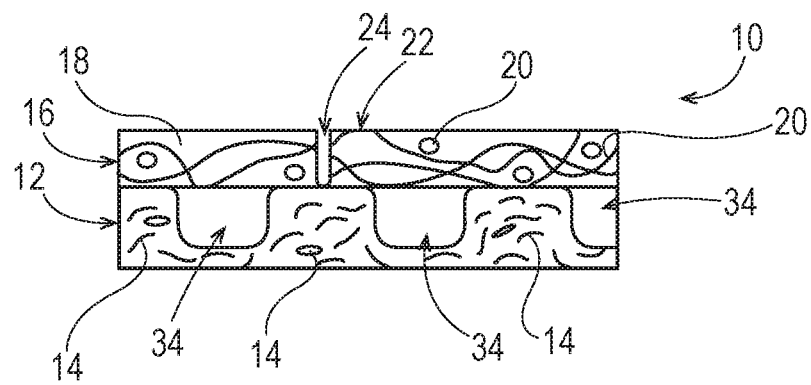
FIG. 4 is a schematic cross-sectional representation of another example of a fibrous structure according to the present invention.

As shown in FIG. 4, in another example of the present invention, the fibrous structure 10 comprises one or more voids 34 (vacuoles) defined by two different materials, for example both the surface material 16 and the first web material 12. A void 34 may be formed by the surface material 16 bridging a texture, such as a depression or channel, such as imparted to a surface of the first web material 12 by a patterned molding member, for example a patterned resin molding member and/or a through-air-drying fabric, such as a coarse through-air-drying fabric, for example as is used in the UCTAD process, and/or an embossing operation and/or a creping operation, such as a belt creping operation and/or a fabric creping operation and/or creping off a drying cylinder, such as a Yankee. The voids 34 of the fibrous structures 10 may be seen using different imaging tools, such as μCT.

As also shown in FIG. 4, the fibrous structure 10 of the present invention may comprise differential planar materials relative to each other, for example a monoplanar material, for example the surface material 16, and a multi-planar material, for example the first web material 12 that comprises a texture.

In one example, the surface material 16 may comprise a water soluble polymer, such as a non-crystalline polymer, for example starch and/or starch derivative and/or polyvinylalcohol, and the first web material 12 may comprise a water insoluble polymer, such as a crystalline polymer, for example cellulose.

In another example, the surface material 16 may comprise a crosslinked polymer, for example crosslinked starch and/or starch derivative and/or crosslinked polyvinyl alcohol, crosslinked by a first crosslinking agent, such as dihydroxyethyleneurea, and the first web material 12 may comprise a second crosslinking agent different from the first crosslinking agent, such as a crosslinking agent that crosslinks its fibrous elements together, such as temporary wet strength crosslinking agents utilized in toilet tissue, for example polyamide-epichlorohydrin chemistries.

In another example, the surface material 16, for example the second web material 18 may comprise a plurality of fibrous elements, for example a plurality of smooth fibrous elements, such as smooth spun filaments, in other words, the exterior surface of the fibrous elements is non-textured, at least relative to the fibrous elements of the first web material 12, for example pulp fibers, such as wood pulp fibers, which are textured (rough) relative to the smooth fibrous elements of the second web material 18.

In still another example, the surface material 16, for example the second web material 18 may comprise a plurality of fibrous elements, for example filaments 20, that exhibit an average diameter (less than 10 μm) less than the average diameter (greater than 10 μm and/or greater than 12 μm) of the fibrous elements, for example fibers 14, such as pulp fibers, of the first web material 12.

In still yet another example, the surface material 16, for example the second web material 18 may comprise a plurality of fibrous elements, for example filaments 20, that exhibit a length (greater than 5.08 cm) greater than the length (5.08 cm or less) of the fibrous elements, for example fibers 14, such as pulp fibers, of the first web material 12.

The fibrous structure 10 of the present invention may further comprise a second surface material to mitigate and/or prevent pilling of the surface material, for example the second web material, during use by a consumer. In one example, the second surface material comprises a third web material comprising a plurality of fibrous elements, for example a plurality of filaments. The third web material may be the same or different from the first surface material, for example the second web material. In one example, the second surface material, for example third web material, is associated with at least the first surface material, for example second web material. In one example, the second surface material, for example third web material, is present at a weight level of less than the first surface material, for example second web material. In one example, the third web material may be present at a basis weight of from about 0.25 gsm to about 5 gsm and/or from about 0.5 gsm to about 4 gsm and/or from about 1 gsm to about 3 gsm and the second web material may be present at a basis weight of greater than 6 gsm and/or greater than 8 gsm and/or greater than 9 gsm and/or greater than 10 gsm and/or from about 10 gsm to about 40 gsm and/or to about 25 gsm. In one example, the second surface material, for example third web material, comprises a hydroxyl polymer different from the first surface material, for example second web material. In other words, the second surface material, for example third web material, may comprise polyvinyl alcohol and the first surface material, for example second web material may comprise starch and/or a starch derivative.

Figure 5:
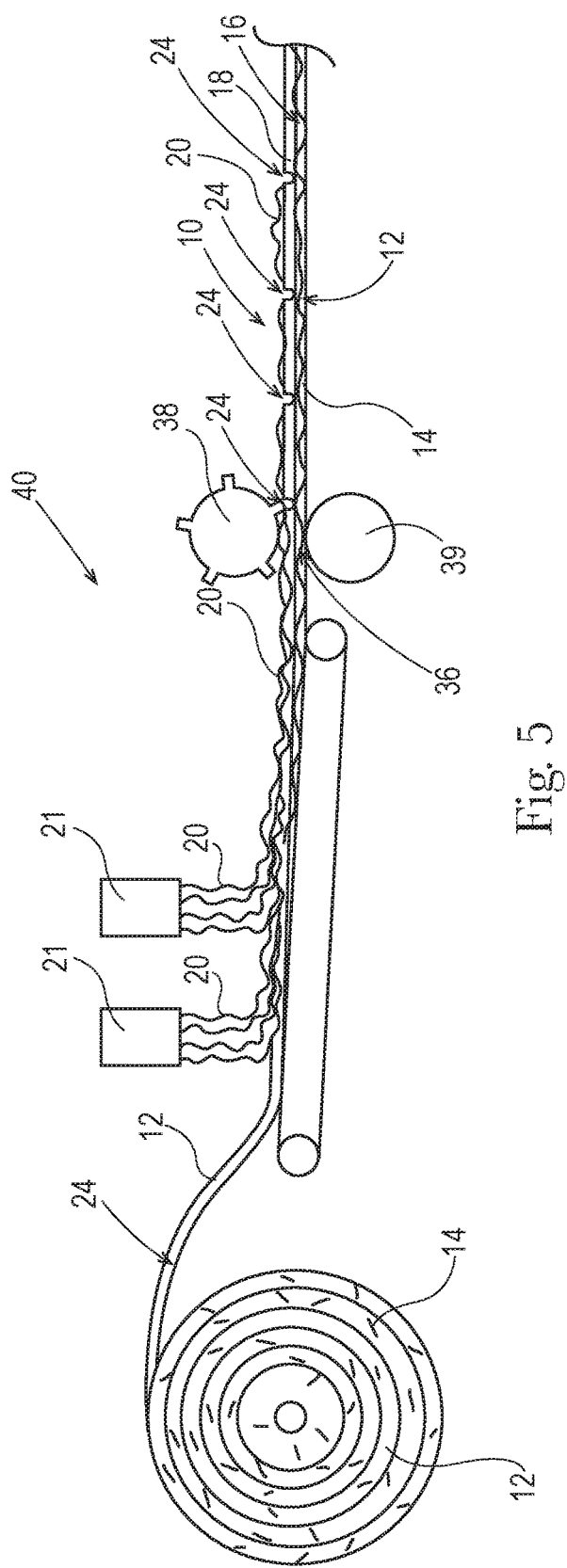
FIG. 5 is a schematic representation of a process for making a fibrous structure according to the present invention.
Figure 6:
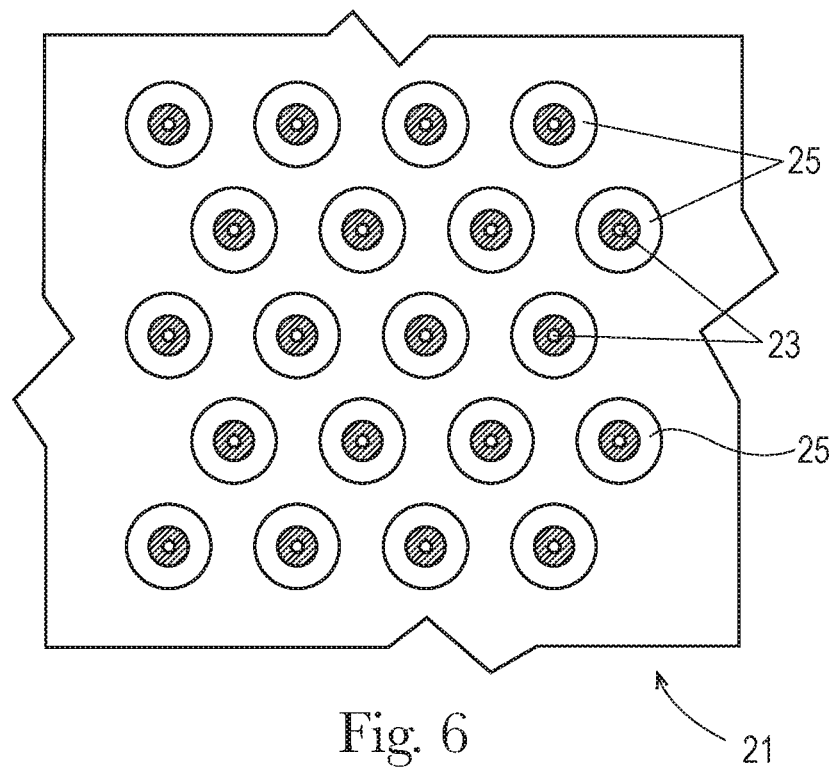
FIG. 6 is a schematic partial top view representation of a surface material source used in the process shown in FIG. 5.

In one example, the fibrous structure 10 of the present invention may be made by the fibrous structure making process 40 shown in FIG. 5 by providing a first web material 12 comprising a plurality of fibrous elements, for example fibers 14, and depositing a surface material 16, for example a plurality of fibrous elements, for example filaments 20, from one or more surface material sources 21, such as a die, for example a meltblow die, such as a multi-row capillary die as shown in FIG. 6 in this case to form a second web material 18 of inter-entangled fibrous elements, for example filaments 20, onto at least one surface of the first web material 12 to form the fibrous structure 10 of the present invention. When a second surface material is applied to the fibrous structure 10, at least one of the surface material sources 21 deposits the second surface material such that the first surface material is positioned between the first web material 12 and the second surface material. The fibrous structure making process 40 may further comprise the step of associating the surface material 16 to the first web material 12 such as by bonding, for example creating thermal bond sites 24 by passing the surface material 16 riding on the first web material 12 through a nip 36 formed a patterned thermal bond roll 38 and an flat roll 39. The fibrous structure making process 40 may optionally comprise the step of winding the fibrous structure 10 into a roll, such as a parent roll for unwinding in a converting operation to cut the roll into consumer-useable sized sanitary tissue product rolls and/or emboss the fibrous structure and/or perforate the fibrous structure into consumer-useable sized sheets of sanitary tissue product. In addition, the roll of fibrous structure may be combined with another fibrous structure ply, the same or different as the roll of fibrous structure to make a multi-ply fibrous structure 26 according to the present invention, an example of which is shown in FIG. 3.

The multi-row capillary die (surface material source 21) shown in FIG. 6 comprises at least one fibrous element-forming hole 23, and/or 2 or more and/or 3 or more rows of fibrous element-forming holes 23 from which filaments are spun. At least one row of the fibrous element-forming holes 23 contains 2 or more and/or 3 or more and/or 10 or more fibrous element-forming holes 23. In addition to the fibrous element-forming holes 23, the multi-row capillary die comprises fluid-releasing holes 25, such as gas-releasing holes, in one example air-releasing holes, that provide attenuation to the filaments formed from the fibrous element-forming holes 23. One or more fluid-releasing holes 25 may be associated with a fibrous element-forming hole 23 such that the fluid exiting the fluid-releasing hole 25 is parallel or substantially parallel (rather than angled like a knife-edge die) to an exterior surface of a filament exiting the fibrous element-forming hole 23. In one example, the fluid exiting the fluid-releasing hole 25 contacts the exterior surface of a filament formed from a fibrous element-forming hole 23 at an angle of less than 30° and/or less than 20° and/or less than 10° and/or less than 5° and/or about 0°. One or more fluid releasing holes 25 may be arranged around a fibrous element-forming hole 23. In one example, one or more fluid-releasing holes 25 are associated with a single fibrous element-forming hole 23 such that the fluid exiting the one or more fluid releasing holes 25 contacts the exterior surface of a single filament formed from the single fibrous element-forming hole 23. In one example, the fluid-releasing hole 25 permits a fluid, such as a gas, for example air, to contact the exterior surface of a filament formed from a fibrous element-forming hole 23 rather than contacting an inner surface of a filament, such as what happens when a hollow filament is formed.

In one example, one or more plies of the fibrous structure according to the present invention may be combined, for example with glue, with another ply of fibrous structure, which may also be a fibrous structure according to the present invention, to form a multi-ply sanitary tissue product. In one example, the multi-ply sanitary tissue product may be formed by combining two or more plies of fibrous structure according to the present invention.

In addition, the fibrous structures of the present invention may be non-lotioned and/or may not contain a post-applied surface chemistry. In another example, the fibrous structures of the present invention may be creped or uncreped. In one example, the fibrous structures of the present invention are uncreped fibrous structures. In one example, the exterior surface of the fibrous structure of the present invention, for example surface 22 of the surface material 16 is not creped (uncreped and/or non-undulating and/or not creped off a surface, such as a Yankee), however the first web material 12 may be creped (undulating and/or creped off a surface, such as a Yankee).

In addition to the fibrous structures of the present invention exhibiting improved surface properties as described herein, such fibrous structures also may exhibit improved cleaning properties, for example bowel movement cleaning properties, compared to known fibrous structures, for example known fibrous structures comprising hydroxyl polymer filaments and known fibrous structures, such as wet-laid and/or air-laid, comprising cellulose fibers, for example pulp fibers. Without wishing to be bound by theory, it is believed that the fibrous structures of the present invention exhibit improved skin benefit and/or glide on skin properties and/or cleaning properties due to the hydroxyl polymer fibrous elements of the present invention exhibiting greater absorbency, without a gooey feel, than pulp fibers, and therefore facilitates better, in reality and/or perception, absorption of bowel movement and/or urine more completely and/or faster than known fibrous structures. In addition, it is believed that the fibrous structures of the present invention that comprise a plurality of hydroxyl polymer fibrous elements, for example hydroxyl polymer filaments in an exterior layer, such as a scrim, provides an improved adsorbency, without a gooey feel, than known fibrous structures, such that the hydroxyl polymer fibrous elements during use contact the user's skin surface and trap and/or lock in the bowel movement or portions thereof. Further, it is believed that the fibrous structures of the present invention that comprise a plurality of hydroxyl polymer fibrous elements, for example hydroxyl polymer filaments in an exterior layer that provide improved surface properties permits a user to apply more force to the fibrous structure during use because the hydroxyl polymer fibrous elements provide a cushion and/or buffer compared to known fibrous structures, especially known wet-laid and/or air-laid fibrous structures that consist or consist essentially of pulp fibers.

The fibrous structures of the present invention may be embossed and/or tufted that creates a three-dimensional surface pattern that provides aesthetics and/or improved cleaning properties. The level of improved cleaning properties relates to the % contact area under a load, such as a user's force applied to the fibrous structure during wiping, and/or % volume/area under a load, such as a user's force applied to the fibrous structure during wiping, created by the three-dimensional surface pattern on the surface of the fibrous structure. In one example, the emboss area may be greater than 10% and/or greater than 12% and/or greater than 15% and/or greater than 20% of the surface area of at least one surface of the fibrous structure.

The fibrous structure of the present invention may also exhibit an CRT Initial Rate at 2 Seconds of greater than 0.50 and/or greater than 0.75 and/or greater than 1.00 and/or greater than 1.25 and/or greater than 1.50 and/or greater than 2.00 and/or greater than 2.25 and/or greater than 2.40 g/2 seconds as measured according to the CRT Test Method described herein.

The fibrous structure of the present invention may comprise two or more components, for example a first component comprising a first web material that exhibits a different bulk density from the second component, such as a the surface material. In one example, the first web material exhibits a lower bulk density than the surface material, for example second web material as determined according to the μCT (Micro-CT) Test Method described herein.

The fibrous structure comprises a least one surface, a consumer-contacting surface, that comes into contact with a consumer during use, such as during wiping. The surface of the fibrous structure may comprise and/or be defined by at least a portion of the first web material.

In one example, the fibrous structure is a wet fibrous structure, for example a fibrous structure comprising a liquid composition.

First Web Material

The first web material comprises a plurality of fibrous elements, for example a plurality of fibers, such as greater than 80% and/or greater than 90% and/or greater than 95% and/or greater than 98% and/or greater than 99% and/or 100% by weight of the first web material of fibers.

In one example, the first web material comprises a plurality of naturally-occurring fibers, for example pulp fibers, such as wood pulp fibers (hardwood and/or softwood pulp fibers). In another example, the first web material comprises a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof. In another example, the first web material comprises a mixture of naturally-occurring fibers, for example pulp fibers, such as wood pulp fibers (hardwood and/or softwood pulp fibers) and a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof.

The first web material may comprise one or more filaments, such as polyolefin filaments, which are not dispersible, for example polypropylene and/or polyethylene filaments, starch filaments, starch derivative filaments, cellulose filaments, polyvinyl alcohol filaments.

The first web material of the present invention may be single-ply or multi-ply web material. In other words, the first web materials of the present invention may comprise one or more first web materials, the same or different from each other so long as one of them comprises a plurality of pulp fibers.

In one example, the first web material comprises a wet laid fibrous structure ply, such as a through-air-dried fibrous structure ply, for example an uncreped, through-air-dried fibrous structure ply and/or a creped, through-air-dried fibrous structure ply.

In another example, the first web material and/or wet laid fibrous structure ply may exhibit substantially uniform density.

In another example, the first web material and/or wet laid fibrous structure ply may exhibit differential density.

In another example, the first web material and/or wet laid fibrous structure ply may comprise a surface pattern.

In one example, the wet laid fibrous structure ply comprises a conventional wet-pressed fibrous structure ply. The wet laid fibrous structure ply may comprise a fabric-creped fibrous structure ply. The wet laid fibrous structure ply may comprise a belt-creped fibrous structure ply.

In still another example, the first web material may comprise an air laid fibrous structure ply.

The first web materials of the present invention may comprise a surface softening agent or be void of a surface softening agent, such as silicones, quaternary ammonium compounds, lotions, and mixtures thereof. In one example, the sanitary tissue product is a non-lotioned first web material.

The first web materials of the present invention may comprise trichome fibers or may be void of trichome fibers.

Patterned Molding Members

The first web materials of the present invention may be formed on patterned molding members that result in the first web materials of the present invention. In one example, the pattern molding member comprises a non-random repeating pattern. In another example, the pattern molding member comprises a resinous pattern.

In one example, the first web material comprises a textured surface. In another example, the first web material comprises a surface comprising a three-dimensional (3D) pattern, for example a 3D pattern imparted to the first web material by a patterned molding member. Non-limiting examples of suitable patterned molding members include patterned felts, patterned forming wires, patterned rolls, patterned fabrics, and patterned belts utilized in conventional wet-pressed papermaking processes, air-laid papermaking processes, and/or wet-laid papermaking processes that produce 3D patterned sanitary tissue products and/or 3D patterned fibrous structure plies employed in sanitary tissue products. Other non-limiting examples of such patterned molding members include through-air-drying fabrics and through-air-drying belts utilized in through-air-drying papermaking processes that produce through-air-dried fibrous structures, for example 3D patterned through-air dried fibrous structures, and/or through-air-dried sanitary tissue products comprising the first web material.

Figure 7:
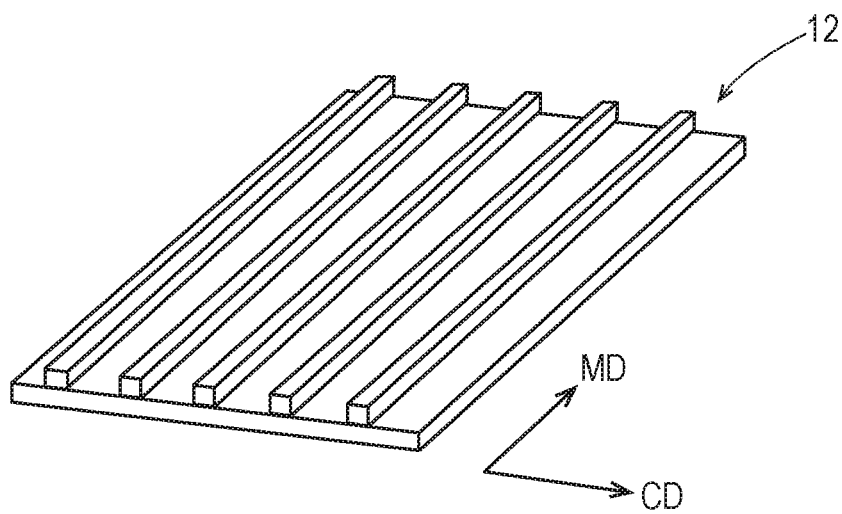
FIG. 7 is a schematic representation of another fibrous structure according to the present invention.

In one example of the present invention, the first web material 12 comprises a 3D patterned first web material having a surface comprising a 3D pattern comprising a first series of line elements that are oriented at an angle of between −20° to 20° with respect the 3D patterned first web material's machine direction as shown in FIG. 7.

The first web material may be made by any suitable method, such as wet-laid, air laid, coform, hydroentangling, carding, meltblowing, spunbonding, and mixtures thereof. In one example the method for making the first web material of the present invention comprises the step of depositing a plurality of fibers onto a collection device, such as a 3D patterned molding member, such as a molding member comprising a first series of line elements that are oriented at an angle of between −40° to 40° and/or −30° to 30° and/or −20° to 20° with respect the 3D patterned first web material's machine direction such that a first web material is formed.

A "reinforcing element" may be a desirable (but not necessary) element in some examples of the molding member, serving primarily to provide or facilitate integrity, stability, and durability of the molding member comprising, for example, a resinous material. The reinforcing element can be fluid-permeable or partially fluid-permeable, may have a variety of embodiments and weave patterns, and may comprise a variety of materials, such as, for example, a plurality of interwoven yarns (including Jacquard-type and the like woven patterns), a felt, a plastic, other suitable synthetic material, or any combination thereof.

Figure 8A:
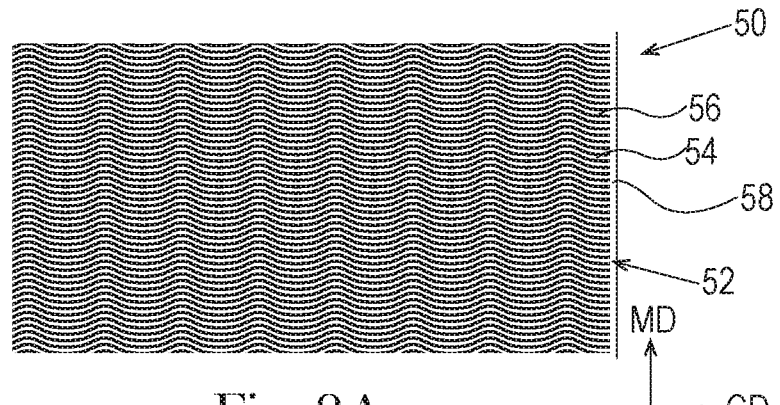
FIG. 8A is a schematic representation of an example of a patterned molding member according to the present invention.
Figure 8B:
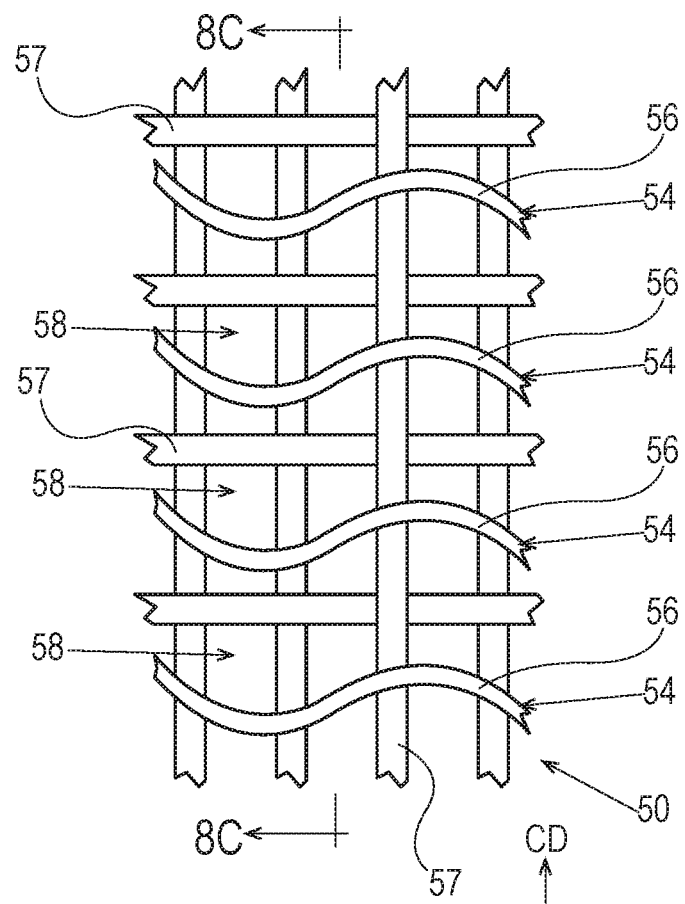
FIG. 8B is a further schematic representation of a portion of the molding member of FIG. 8A.
Figure 9A:
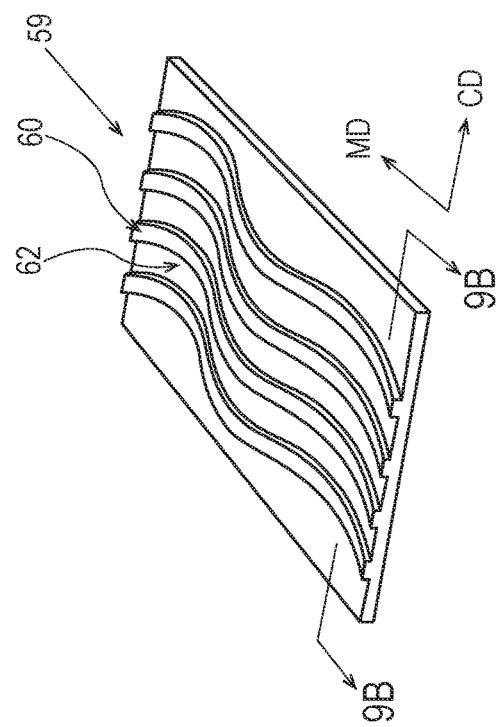
FIG. 9A is a schematic representation of an example of a first web material according to the present invention made using the molding member of FIG. 8A.
Figure 9B:
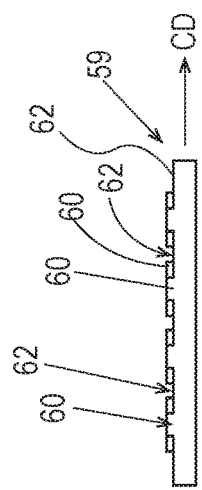
FIG. 9B is a cross-sectional view of FIG. 9A taken along line 9B-9B.
Figure 8C:
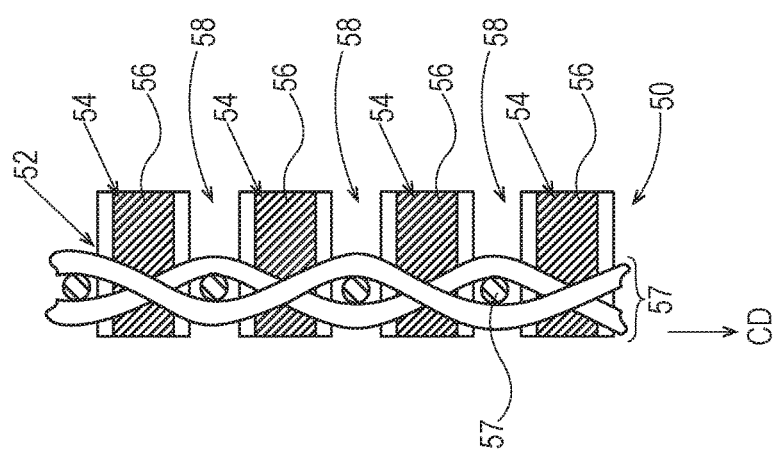
FIG. 8C is a cross-sectional view of FIG. 8B taken along line 8C-8C.

As shown in FIGS. 8A-8C, a non-limiting example of a patterned molding member 50 suitable for use in the present invention comprises a through-air-drying belt 52. The through-air-drying belt 52 comprises a plurality of semi-continuous knuckles 54 formed by semi-continuous line segments of resin 56 arranged in a non-random, repeating pattern, for example a substantially machine direction repeating pattern of semi-continuous line segments 56 supported on a support fabric comprising filaments 57. In this case, the semi-continuous line segments 56 are curvilinear, for example sinusoidal. The semi-continuous knuckles 54 are spaced from adjacent semi-continuous knuckles 54 by semi-continuous pillows 58, which constitute deflection conduits into which portions of a fibrous structure ply being made on the through-air-drying belt 52 of FIGS. 8A-8C deflect. As shown in FIGS. 9A-9B, a resulting first web material 59 being made on the through-air-drying belt 52 of FIGS. 8A-8C comprises semi-continuous pillow regions 60 imparted by the semi-continuous pillows 58 of the through-air-drying belt 52 of FIGS. 8A-8C. The sanitary tissue product 59 further comprises semi-continuous knuckle regions 62 imparted by the semi-continuous knuckles 54 of the through-air-drying belt 52 of FIGS. 8A-8C. The semi-continuous pillow regions 60 and semi-continuous knuckle regions 62 may exhibit different densities, for example, one or more of the semi-continuous knuckle regions 62 may exhibit a density that is greater than the density of one or more of the semi-continuous pillow regions 60.

Non-Limiting Examples of Making First Web Materials

The first web materials of the present invention may be made by any suitable papermaking process, such as conventional wet press papermaking process, through-air-dried papermaking process, belt-creped papermaking process, fabric-creped papermaking process, creped papermaking process, uncreped papermaking process, coform process, and air-laid process, so long as the first web material comprises a plurality of fibers. In one example, the first web material is made on a molding member of the present invention is used to make the first web material of the present invention. The method may be a first web material making process that uses a cylindrical dryer such as a Yankee (a Yankee-process) or it may be a Yankeeless process as is used to make substantially uniform density and/or uncreped first web materials (fibrous structures). Alternatively, the first web materials may be made by an air-laid process and/or meltblown and/or spunbond processes and any combinations thereof so long as the first web materials of the present invention are made thereby.

Figure 10:
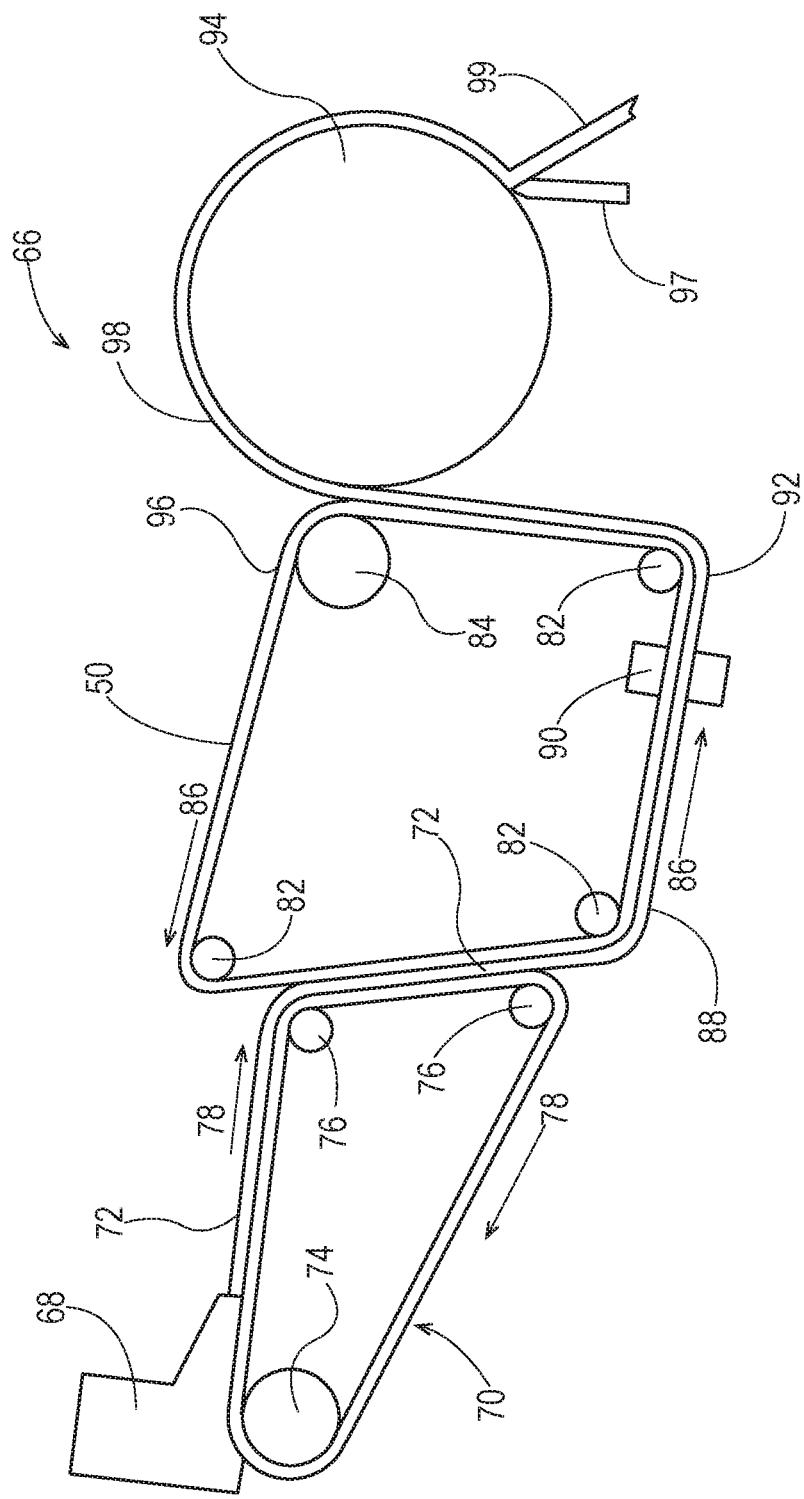
FIG. 10 is a schematic representation of an example of a through-air-drying papermaking process for making a first web material according to the present invention.

As shown in FIG. 10, one example of a process and equipment, represented as 66 for making a first web material according to the present invention comprises supplying an aqueous dispersion of fibers (a fibrous furnish or fiber slurry)

to a headbox 68 which can be of any convenient design. From headbox 68 the aqueous dispersion of fibers is delivered to a first foraminous member 70 which is typically a Fourdrinier wire, to produce an embryonic fibrous structure 72.

The first foraminous member 70 may be supported by a breast roll 74 and a plurality of return rolls 76 of which only two are shown. The first foraminous member 70 can be propelled in the direction indicated by directional arrow 78 by a drive means, not shown. Optional auxiliary units and/or devices commonly associated fibrous structure making machines and with the first foraminous member 70, but not shown, include forming boards, hydrofoils, vacuum boxes, tension rolls, support rolls, wire cleaning showers, and the like.

After the aqueous dispersion of fibers is deposited onto the first foraminous member 70, embryonic fibrous structure 72 is formed, typically by the removal of a portion of the aqueous dispersing medium by techniques well known to those skilled in the art. Vacuum boxes, forming boards, hydrofoils, and the like are useful in effecting water removal. The embryonic web material 72 may travel with the first foraminous member 70 about return roll 76 and is brought into contact with a patterned molding member 50, such as a 3D patterned through-air-drying belt, for example as shown in FIGS. 8A-8C. While in contact with the patterned molding member 50, the embryonic web material 72 will be deflected, rearranged, and/or further dewatered. This can be accomplished by applying differential speeds and/or pressures.

The patterned molding member 50 may be in the form of an endless belt. In this simplified representation, the patterned molding member 50 passes around and about patterned molding member return rolls 82 and impression nip roll 84 and may travel in the direction indicated by directional arrow 86. Associated with patterned molding member 50, but not shown, may be various support rolls, other return rolls, cleaning means, drive means, and the like well known to those skilled in the art that may be commonly used in fibrous structure making machines.

After the embryonic web material 72 has been associated with the patterned molding member 50, fibers within the embryonic web material 72 are deflected into pillows ("deflection conduits") present in the patterned molding member 50. In one example of this process step, there is essentially no water removal from the embryonic web material 72 through the deflection conduits after the embryonic web material 72 has been associated with the patterned molding member 50 but prior to the deflecting of the fibers into the deflection conduits. Further water removal from the embryonic web material 72 can occur during and/or after the time the fibers are being deflected into the deflection conduits. Water removal from the embryonic web material 72 may continue until the consistency of the embryonic web material 42 associated with patterned molding member 50 is increased to from about 25% to about 35%. Once this consistency of the embryonic web material 72 is achieved, then the embryonic web material 72 can be referred to as an intermediate web material 88. During the process of forming the embryonic web material 72, sufficient water may be removed, such as by a noncompressive process, from the embryonic web material 72 before it becomes associated with the patterned molding member 50 so that the consistency of the embryonic web material 72 may be from about 10% to about 30%.

As noted, water removal occurs both during and after deflection; this water removal may result in a decrease in fiber mobility in the embryonic web material. This decrease in fiber mobility may tend to fix and/or freeze the fibers in place after they have been deflected and rearranged. Of course, the drying of the web material in a later step in the process of this invention serves to more firmly fix and/or freeze the fibers in position.

Any convenient means conventionally known in the papermaking art can be used to dry the intermediate web material 88. Examples of such suitable drying process include subjecting the intermediate web material 88 to conventional and/or flow-through dryers and/or Yankee dryers.

In one example of a drying process, the intermediate web material 88 in association with the patterned molding member 50 passes around the patterned molding member return roll 82 and travels in the direction indicated by directional arrow 86. The intermediate web material 88 may first pass through an optional predryer 90. This predryer 90 can be a conventional flow-through dryer (hot air dryer) well known to those skilled in the art. Optionally, the predryer 90 can be a so-called capillary dewatering apparatus. In such an apparatus, the intermediate web material 88 passes over a sector of a cylinder having preferential-capillary-size pores through its cylindrical-shaped porous cover. Optionally, the predryer 90 can be a combination capillary dewatering apparatus and flow-through dryer. The quantity of water removed in the predryer 90 may be controlled so that a predried web material 92 exiting the predryer 90 has a consistency of from about 30% to about 98%. The predried web material 92, which may still be associated with patterned molding member 50, may pass around another patterned molding member return roll 82 and as it travels to an impression nip roll 84. As the predried web material 92 passes through the nip formed between impression nip roll 84 and a surface of a Yankee dryer 94, the pattern formed by the top surface 96 of patterned molding member 50 is impressed into the predried web material 92 to form a 3D patterned web material 98, a first web material of the present invention. The 3D patterned web material 98 can then be adhered to the surface of the Yankee dryer 94 where it can be dried to a consistency of at least about 95%.

The 3D patterned web material 98 can then be foreshortened by creping (creped off the Yankee) the 3D patterned web material 98 with a creping blade 97 to remove the 3D patterned web material 98 from the surface of the Yankee dryer 94 resulting in the production of a 3D patterned creped web material 99, which is a non-limiting example of a first web material in accordance with the present invention. As used herein, foreshortening refers to the reduction in length of a dry (having a consistency of at least about 90% and/or at least about 95%) web material which occurs when energy is applied to the dry web material in such a way that the length of the dry web material is reduced and the fibers in the dry web material are rearranged with an accompanying disruption of fiber-fiber bonds. Foreshortening can be accomplished in any of several well-known ways. One common method of foreshortening is creping. Further, the 3D patterned creped web material 99 may be subjected to post processing steps such as calendaring, tuft generating operations, and/or embossing and/or converting.

Surface Material

In addition to the first web material, the fibrous structure of the present invention comprises a surface material. The surface material of the fibrous structure is different from the first web material. The surface material may be associated with the first web material, directly (meaning in direct contact with a surface of the first web material) and/or indirectly (meaning one or more intermediate materials are positioned between the surface of the first web material and the surface material. In one example, the surface material is associated with the first web material through one or more bond sites, for example at least one of the bond sites comprise a thermal bond and/or at least one of the bond sites comprises an adhesive bond. In one example, the surface material may be directly bonded to a surface of the first web material. In another example, the surface material may be indirectly bonded to a surface of the first web material by being bonded to one or more intermediate materials positioned between the surface of the first web material and the surface material. The intermediate materials may be fibrous elements, web materials, liquids, particles, and/or surface coatings, such as surface softening agents, present on the surface of the first web material.

In one example, the surface material comprises a second web material. The second web material may comprise a plurality of fibrous elements, such as fibers and/or filaments. In one example, the second web material comprise a plurality of naturally-occurring fibers, for example pulp fibers, such as wood pulp fibers (hardwood and/or softwood pulp fibers).

In another example, the second web material comprises a plurality of non-naturally occurring fibers (synthetic fibers), for example staple fibers, such as a hydroxyl polymer, such as rayon, lyocell, polyester fibers, polycaprolactone fibers, polylactic acid fibers, polyhydroxyalkanoate fibers, hydroxyl polymer fibers, such as polyvinyl alcohol fibers and/or polysaccharide fibers, for example cellulose, cellulose derivatives, starch, starch derivatives, hemicelluloses, hemicelluloses derivatives, and mixtures thereof.

In another example, the second web material comprises a mixture of naturally-occurring fibers, for example pulp fibers, such as wood pulp fibers (hardwood and/or softwood pulp fibers) and a plurality of non-naturally occurring fibers (synthetic fibers), for example staple fibers, such as rayon, lyocell, polyester fibers, polycaprolactone fibers, polylactic acid fibers, polyhydroxyalkanoate fibers, and mixtures thereof.

In one example, the surface material and/or second web material comprises rayon fibers.

The second web material may comprise one or more filaments, for example one or more filaments comprising a polymer, such as polyolefin filaments, for example polypropylene filaments and/or polyethylene filaments, and/or a hydroxyl polymer filament, such as cellulose filaments, cellulose derivative filaments, starch filaments, starch derivative filaments, hemicelluloses filaments, hemicelluloses derivative filaments, and mixtures thereof. The filaments of the second web material may exhibit an average diameter of less than 50 µm and/or less than 25 µm and/or less than 20 µm and/or less than 15 µm and/or less than 10 µm and/or greater than 1 µm and/or greater than 3 µm and/or from about 3-10 µm and/or from about 3-8 µm and/or from about 5-7 µm as measured according to the Average Diameter Test Method described herein.

In one example the filaments of the second web material comprise a crosslinked polymer, such as a crosslinked polyvinyl alcohol and/or a crosslinked starch.

In one example, the second web material may be a first web material described above so long as the second web material is different from the first web material. In one example, the second web material comprises a plurality of fibrous elements that are different from the fibrous elements, for example fibers, of the first web material.

In one example, the second web material exhibits a basis weight that is different from the basis weight of the first web material as measured according to the Basis Weight Test Method described herein.

In one example, the surface material comprises a second web material comprising a plurality of filaments, for example a plurality of hydroxyl polymer filaments such as hydroxyl polymer filaments comprising a polymer selected from the group consisting of: polyvinyl alcohol, starch, starch derivatives, and mixtures thereof.

One solution to the problem identified above is to make fibrous structures comprising a plurality of hydroxyl polymer filaments present in at least one exterior layer of the fibrous structure at greater than 10 gsm such that the fibrous structure exhibits average Emtec values as measured according to the Emtec Test Method described herein that are less than the average Emtec values exhibited by known fibrous structures comprising lower levels (2 to 3 gsm for example) of hydroxyl polymer filaments in their exterior layers. In one example, the improved ability to increase the level of hydroxyl polymer filaments in the exterior layers of the fibrous structures of the present invention is attributable to features of the polymer melt composition as described herein, for example the type of hydroxyl polymer and/or the effectiveness of the crosslinking of the hydroxyl polymer, which relates at least partially to the level of base such as triethanolamine present in the crosslinking agent used to make the hydroxyl polymer fibrous elements, for example less than 2% and/or less than 1.8% and/or less than 1.5% and/or less than 1.25% and/or about 0% and/or about 0.25% and/or about 0.5% by weight, to produce the hydroxyl polymer fibrous elements.

In one example of the present invention, a fibrous structure comprising a plurality of hydroxyl polymer filaments present in at least one exterior layer of the fibrous structure at a level of greater than 10 and/or greater than 12 and/or greater than 14 and/or greater than 16 and/or at least 18 and/or less than 40 and/or less than 35 and/or less than 30 and/or less than 25 gsm is provided. The second web material may comprise a plurality of hydroxyl polymer fibrous elements at a basis weight of greater than 6 and/or greater than 8 and/or greater than 10 and/or greater than 12 and/or greater than 14 and/or greater than 16 and/or greater than 18 and/or less than 40 and/or less than 35 and/or less than 30 and/or less than 25 g/m$^2$ ("gsm") and/or from about 12 to about 40 g/m$^2$ and/or from about 12 to about 35 g/m$^2$ and/or from about 12 to about 30 g/m$^2$ and/or from about 16 to about 25 g/m$^2$. The basis weight of the scrim material and/or exterior layer or other layers of the fibrous structure are known by the manufacturer when making the fibrous structure and may be determined by other means such as tape stripping or other suitable means known to those in the art.

In another example of the present invention, a fibrous structure comprising a first outer layer comprising a plurality of hydroxyl polymer filaments present in the first outer layer at a basis weight of greater than 10 gsm.

An example of a method for making a surface material, for example a second web material, according to the present invention comprises the step of spinning a polymer melt composition comprising a polymer, for example a hydroxyl polymer, a crosslinking agent, and optionally, a surfactant, into a plurality of fibrous elements, for example a plurality of hydroxyl polymer filaments. The plurality of fibrous elements may be spun directly onto the first web material and/or collected on a collection device and then subsequently associated with the first web material. In one example, the plurality of fibrous elements, for example the plurality of hydroxyl polymer filaments may be present as the exterior layer of the fibrous structure of the present invention at a level of greater than 10 and/or greater than 12 and/or greater than 14 and/or greater than 16 and/or at least 18 and/or less than 40 and/or less than 35 and/or less than 30 and/or less than 25 gsm.

The present invention provides novel fibrous structures that comprise a higher level of hydroxyl polymer filaments in at least one exterior layer of the fibrous structure compared to known fibrous structures comprising hydroxyl polymer filaments in their exterior layers, and methods for making such fibrous structures.

Fibrous Elements

The fibrous elements of the present invention may be produced from a polymer melt composition, for example a hydroxyl polymer melt composition such as an aqueous hydroxyl polymer melt composition, comprising a hydroxyl polymer, such as an uncrosslinked starch for example a dent corn starch, an acid-thinned starch, and/or a starch derivative such as an ethoxylated starch, a crosslinking system comprising a crosslinking agent, such as an imidazolidinone, and water. In one example, the crosslinking agent comprises less than 2% and/or less than 1.8% and/or less than 1.5% and/or less than 1.25% and/or 0% and/or about 0.25% and/or about 0.50% by weight of a base, for example triethanolamine. It has unexpectedly been found that the reducing the level of base in the crosslinking agent used in the polymer melt composition results in more effective crosslinking. In one example, the fibrous elements of the present invention comprise greater than 25% and/or greater than 40% and/or greater than 50% and/or greater than 60% and/or greater than 70% to about 95% and/or to about 90% and/or to about 80% by weight of the fibrous element of a hydroxyl polymer, such as starch, which may be in a crosslinked state. In one example, the fibrous element comprises an ethoxylated starch and an acid thinned starch, which may be in their crosslinked states.

The fibrous elements may also comprise a crosslinking agent, such as an imidazolidinone, which may be in its crosslinked state (crosslinking the hydroxyl polymers present in the fibrous elements) at a level of from about 0.25% and/or from about 0.5% and/or from about 1% and/or from about 2% and/or from about 3% and/or to about 10% and/or to about 7% and/or to about 5.5% and/or to about 4.5% by weight of the fibrous element. In addition to the crosslinking agent, the fibrous element may comprise a crosslinking facilitator that aids the crosslinking agent at a level of from 0% and/or from about 0.3% and/or from about 0.5% and/or to about 2% and/or to about 1.7% and/or to about 1.5% by weight of the fibrous element.

In one example, the hydroxyl polymer fibrous element, for example hydroxyl polymer filament, comprises a crosslinked hydroxyl polymer, such as a crosslinked starch and/or starch derivative.

The polymer melt composition may also comprise a surfactant, such as a sulfosuccinate surfactant. A non-limiting example of a suitable sulfosuccinate surfactant comprises Aerosol® AOT (a sodium dioctyl sulfosuccinate) and/or Aerosol® MA-80 (a sodium dihexyl sulfosuccinate), which are commercially available from Cytec. The surfactant, such as a sulfosuccinate surfactant, may be present at a level of from 0% and/or from about 0.1% and/or from about 0.3% to about 2% and/or to about 1.5% and/or to about 1.1% and/or to about 0.7% by weight of the fibrous element.

In addition to the crosslinking agent, the polymer melt composition may comprise a crosslinking facilitator such as ammonium salts of methanesulfonic acid, ethanesulfonic acid, propanesulfonic acid, isopropylsulfonic acid, butanesulfonic acid, isobutylsulfonic acid, sec-butylsulfonic acids, benzenesulfonic acid, toluenesulfonic acid, xylenesulfonic acid, cumenesulfonic acid, alkylbenzenesulfonic, alkylnaphthalenedisulfonic acids.

The fibrous elements may also comprise a polymer selected from the group consisting of: polyacrylamide and its derivatives; acrylamide-based copolymers, polyacrylic acid, polymethacrylic acid, and their esters; polyethyleneimine; copolymers made from mixtures of monomers of the aforementioned polymers; and mixtures thereof at a level of from 0% and/or from about 0.01% and/or from about 0.05% and/or to about 0.5% and/or to about 0.3% and/or to about 0.2% by weight of the fibrous element. Such polymers may exhibits a weight average molecular weight of greater than 500,000 g/mol. In one example, the fibrous element comprises polyacrylamide.

The fibrous elements may also comprise various other ingredients such as propylene glycol, sorbitol, glycerin, and mixtures thereof.

One or more hueing agents, such as Violet CT may also be present in the polymer melt composition and/or fibrous elements formed therefrom.

In one example, the fibrous elements, of the present invention comprise a fibrous element-forming polymer, such as a hydroxyl polymer, for example a crosslinked hydroxyl polymer. In one example, the fibrous elements may comprise two or more fibrous element-forming polymers, such as two or more hydroxyl polymers. In another example, the fibrous element may comprise two or more fibrous element-forming polymers, such as two or more hydroxyl polymers, at least one of which is starch and/or a starch derivative. In still another example, the fibrous elements of the present invention may comprise two or more fibrous element-forming polymers at least one of which is a hydroxyl polymer and at least one of which is a non-hydroxyl polymer.

In yet another example, the fibrous elements of the present invention may comprise two or more non-hydroxyl polymers. In one example, at least one of the non-hydroxyl polymers exhibits a weight average molecular weight of greater than 1,400,000 g/mol and/or is present in the fibrous elements at a concentration greater than its entanglement concentration ($C_e$) and/or exhibits a polydispersity of greater than 1.32. In still another example, at least one of the non-hydroxyl polymers comprises an acrylamide-based copolymer.

In one example, the fibrous element comprises a filament. In another example, the fibrous element comprises a fiber, such as a filament that has been cut into fibers.

Fibrous Element-Forming Polymers

The polymer melt compositions of the present invention, for example hydroxyl polymer melt compositions such as aqueous hydroxyl polymer melt compositions, and/or fibrous elements, such as filaments and/or fibers, of the present invention that associate to form fibrous structures of the present invention contain at least one fibrous element-forming polymer, such as a hydroxyl polymer, and may contain other types of polymers such as non-hydroxyl polymers that exhibit weight average molecular weights of greater than 500,000 g/mol and mixtures thereof.

Non-limiting examples of hydroxyl polymers in accordance with the present invention include polyols, such as polyvinyl alcohol, polyvinyl alcohol derivatives, polyvinyl alcohol copolymers, starch, starch derivatives, starch copolymers, chitosan, chitosan derivatives, chitosan copolymers, cellulose, cellulose derivatives such as cellulose ether and ester derivatives, cellulose copolymers, hemicellulose, hemicellulose derivatives, hemicellulose copolymers, gums, arabinans, galactans, proteins and various other polysaccharides and mixtures thereof.

In one example, a hydroxyl polymer of the present invention comprises a polysaccharide.

In another example, a hydroxyl polymer of the present invention comprises a non-thermoplastic polymer.

The hydroxyl polymer may have a weight average molecular weight of from about 10,000 g/mol to about 40,000,000 g/mol and/or greater than 100,000 g/mol and/or greater than 1,000,000 g/mol and/or greater than 3,000,000 g/mol and/or greater than 3,000,000 g/mol to about 40,000,000 g/mol. Higher and lower molecular weight hydroxyl polymers may be used in combination with hydroxyl polymers having a certain desired weight average molecular weight.

Polyvinyl alcohols herein can be grafted with other monomers to modify its properties. A wide range of monomers has been successfully grafted to polyvinyl alcohol. Non-limiting examples of such monomers include vinyl acetate, styrene, acrylamide, acrylic acid, 2-hydroxyethyl methacrylate, acrylonitrile, 1,3-butadiene, methyl methacrylate, methacrylic acid, vinylidene chloride, vinyl chloride, vinyl amine and a variety of acrylate esters. Polyvinyl alcohols comprise the various hydrolysis products formed from polyvinyl acetate. In one example the level of hydrolysis of the polyvinyl alcohols is greater than 70% and/or greater than 88% and/or greater than 95% and/or about 99%.

"Polysaccharides" as used herein means natural polysaccharides and polysaccharide derivatives and/or modified polysaccharides. Suitable polysaccharides include, but are not limited to, starches, starch derivatives, starch copolymers, chitosan, chitosan derivatives, chitosan copolymers, cellulose, cellulose derivatives, cellulose copolymers, hemicellulose, hemicellulose derivatives, hemicelluloses copolymers, gums, arabinans, galactans, and mixtures thereof. The polysaccharide may exhibit a weight average molecular weight of from about 10,000 to about 40,000,000 g/mol and/or greater than about 100,000 and/or greater than about 1,000,000 and/or greater than about 3,000,000 and/or greater than about 3,000,000 to about 40,000,000.

The polysaccharides of the present invention may comprise non-cellulose and/or non-cellulose derivative and/or non-cellulose copolymer hydroxyl polymers. Non-limiting example of such non-cellulose polysaccharides may be selected from the group consisting of: starches, starch derivatives, starch copolymers, chitosan, chitosan derivatives, chitosan copolymers, hemicellulose, hemicellulose derivatives, hemicelluloses copolymers, and mixtures thereof.

In one example, the hydroxyl polymer comprises starch, a starch derivative and/or a starch copolymer. In another example, the hydroxyl polymer comprises starch and/or a starch derivative. In yet another example, the hydroxyl polymer comprises starch. In one example, the hydroxyl polymer comprises ethoxylated starch. In another example, the hydroxyl polymer comprises acid-thinned starch. In still another example, the hydroxyl polymer comprises Dent corn starch.

As is known, a natural starch can be modified chemically or enzymatically, as well known in the art. For example, the natural starch can be acid-thinned, hydroxy-ethylated, hydroxy-propylated, ethersuccinylated or oxidized. In one example, the starch comprises a high amylopectin natural starch (a starch that contains greater than 75% and/or greater than 90% and/or greater than 98% and/or about 99% amylopectin). Such high amylopectin natural starches may be derived from agricultural sources, which offer the advantages of being abundant in supply, easily replenishable and relatively inexpensive. Chemical modifications of starch typically include acid or alkaline-catalyzed hydrolysis and chain scission (oxidative and/or enzymatic) to reduce molecular weight and molecular weight distribution. Suitable compounds for chemical modification of starch include organic acids such as citric acid, acetic acid, glycolic acid, and adipic acid; inorganic acids such as hydrochloric acid, sulfuric acid, nitric acid, phosphoric acid, boric acid, and partial salts of polybasic acids, e.g., $KH_2PO_4$, $NaHSO_4$; group Ia or IIa metal hydroxides such as sodium hydroxide, and potassium hydroxide; ammonia; oxidizing agents such as hydrogen peroxide, benzoyl peroxide, ammonium persulfate, potassium permanganate, hypochloric salts, and the like; and mixtures thereof.

"Modified starch" is a starch that has been modified chemically or enzymatically. The modified starch is contrasted with a native starch, which is a starch that has not been modified, chemically or otherwise, in any way.

Chemical modifications may also include derivatization of starch by reaction of its hydroxyl groups with alkylene oxides, and other ether-, ester-, urethane-, carbamate-, or isocyanate-forming substances. Hydroxyalkyl, ethersuccinylated, acetyl, or carbamate starches or mixtures thereof can be used as chemically modified starches. The degree of substitution of the chemically modified starch is from 0.001 to 3.0, and more specifically from 0.003 to 0.2. Biological modifications of starch may include bacterial digestion of the carbohydrate bonds, or enzymatic hydrolysis using enzymes such as amylase, amylopectase, and the like.

Generally, all kinds of natural starches can be used in the present invention. Suitable naturally occurring starches can include, but are not limited to: corn starch, potato starch, sweet potato starch, wheat starch, sago palm starch, tapioca starch, rice starch, soybean starch, arrow root starch, amioca starch, bracken starch, lotus starch, waxy maize starch, and high amylose corn starch. Naturally occurring starches, particularly corn starch and wheat starch, can be particularly beneficial due to their low cost and availability.

In one example, to generate rheological properties suitable for high-speed fibrous element spinning processes, the molecular weight of the natural, unmodified starch may be reduced. The optimum molecular weight is dependent on the type of starch used. For example, a starch with a low level of amylose component, such as a waxy maize starch, disperses rather easily in an aqueous solution with the application of heat and does not retrograde or recrystallize significantly. With these properties, a waxy maize starch can be used at a weight average molecular weight, for example in the range of 500,000 g/mol to 40,000,000 g/mol. Modified starches such as hydroxy-ethylated Dent corn starch, which contains about 25% amylose, or oxidized Dent corn starch tend to retrograde more than waxy maize starch but less than acid thinned starch. This retrogradation, or recrystallization, acts as a physical cross-linking to effectively raise the weight average molecular weight of the starch in aqueous solution. Therefore, an appropriate weight average molecular weight for a typical commercially available hydroxyethylated Dent corn starch with 2 wt. % hydroxyethylation or oxidized Dent corn starch is from about 200,000 g/mol to about 10,000,000 g/mol. For ethoxylated starches with higher degrees of ethoxylation, for example a hydroxyethylated Dent corn starch with 5 wt % hydroxyethylation, weight average molecular weights of up to 40,000,000 g/mol may be suitable for the present invention. For acid thinned Dent corn starch, which tends to retrograde more than oxidized Dent corn starch, the appropriate weight average molecular weight is from about 100,000 g/mol to about 15,000,000 g/mol.

The weight average molecular weight of starch may also be reduced to a desirable range for the present invention by physical/mechanical degradation (e.g., via the thermomechanical energy input of the processing equipment).

The natural starch can be hydrolyzed in the presence of an acid catalyst to reduce the molecular weight and molecular weight distribution of the composition. The acid catalyst can be selected from the group consisting of hydrochloric acid, sulfuric acid, phosphoric acid, citric acid, ammonium chloride and any combination thereof. Also, a chain scission agent may be incorporated into a spinnable starch composition such that the chain scission reaction takes place substantially concurrently with the blending of the starch with other components. Non-limiting examples of oxidative chain scission agents suitable for use herein include ammonium persulfate, hydrogen peroxide, hypochlorite salts, potassium permanganate, and mixtures thereof. Typically, the chain scission agent is added in an amount effective to reduce the weight average molecular weight of the starch to the desirable range. It is found that compositions having modified starches in the suitable weight average molecular weight ranges have suitable shear viscosities, and thus improve processability of the composition. The improved processability is evident in less interruptions of the process (e.g., reduced breakage, shots, defects, hang-ups) and better surface appearance and strength properties of the final product, such as fibers of the present invention.

In one example, the fibrous element of the present invention is void of thermoplastic, water-insoluble polymers.

In one example, the fibrous element-forming polymers may be present in the aqueous hydroxyl polymer melt composition at an amount of from about 20% to about 50% and/or from about 30% to about 50% and/or from about 35% to about 48% by weight of the aqueous hydroxyl polymer melt composition and present in a polymeric structure, for example fibrous element and/or fibrous structure, at a level of from about 50% to about 100% and/or from about 60% to about 98% and/or from about 75% to about 95% by weight of the polymeric structure, for example fibrous element and/or fibrous structure.

Other Polymers

The polymer melt compositions of the present invention and/or fibrous elements, such as filaments of the present invention may comprise, in addition to the fibrous element-forming polymer, other polymers, such as non-hydroxyl polymers.

Non-limiting examples of suitable non-hydroxyl polymers that may be included in the fibrous elements of the present invention include non-hydroxyl polymers that exhibit a weight average molecular weight of greater than 500,000 g/mol and/or greater than 750,000 g/mol and/or greater than 1,000,000 g/mol and/or greater than 1,250,000 g/mol and/or at greater than 1,400,000 g/mol and/or at least 1,450,000 g/mol and/or at least 1,500,000 g/mol and/or less than 10,000,000 g/mol and/or less than 5,000,000 g/mol and/or less than 2,500,00 g/mol and/or less than 2,000,000 g/mol and/or less than 1,750,000 g/mol.

In one example, the non-hydroxyl polymer exhibits a polydispersity of greater than 1.10 and/or at least 1.20 and/or at least 1.30 and/or at least 1.32 and/or at least 1.40 and/or at least 1.45.

Non-limiting examples of suitable non-hydroxyl polymers include polyacrylamide and derivatives such as carboxyl modified polyacrylamide polymers and copolymers including polyacrylic, poly(hydroxyethyl acrylic), polymethacrylic acid and their partial esters; vinyl polymers including polyvinylalcohol, polyvinylpyrrolidone, and the like; polyamides; polyalkylene oxides such as polyethylene oxide and mixtures thereof. Copolymers or graft copolymers made from mixtures of monomers selected from the aforementioned polymers are also suitable herein. Non-limiting examples of commercially available polyacrylamides include nonionic polyacrylamides such as N300 from Kemira or Hyperfloc® NF221, NF301, and NF241 from Hychem, Inc.

In one example, the non-hydroxyl polymers may be present in an amount of from about 0.01% to about 10% and/or from about 0.05% to about 5% and/or from about 0.075% to about 2.5% and/or from about 0.1% to about 1%, by weight of the aqueous hydroxyl polymer melt composition, filament and/or fibrous structure.

In yet another example, the non-hydroxyl polymer comprises a linear polymer. In another example, the non-hydroxyl polymer comprises a long chain branched polymer. In still another example, the non-hydroxyl polymer is compatible with the hydroxyl polymer at a concentration greater than the non-hydroxyl polymer's entanglement concentration $C_e$.

Non-limiting examples of suitable non-hydroxyl polymers are selected from the group consisting of: polyacrylamide and its derivatives; polyacrylic acid, polymethacrylic acid and their esters; polyethyleneimine; copolymers made from mixtures of the aforementioned polymers; and mixtures thereof. In one example, the non-hydroxyl polymer comprises polyacrylamide. In one example, the fibrous elements comprises two or more non-hydroxyl polymers, such as two or more polyacrylamides, such at two or more different weight average molecular weight polyacrylamides.

In one example, the non-hydroxyl polymer comprises an acrylamide-based copolymer. In another example, the non-hydroxyl polymer comprises a polyacrylamide and an acrylamide-based copolymer. In one example, the acrylamide-based copolymer is derived from an acrylamide monomer and at least one monomer selected from the group consisting of: pendant hydroxyl-containing monomers, pendant hydroxyl alkylether-containing monomers, pendant hydroxyl alkylester-containing monomers, pendant hydroxyl alkylamide-containing monomers, and mixtures thereof. In one example, the acrylamide-based copolymer comprises an acrylamide monomeric unit and at least one monomeric unit selected from the group consisting of: pendant hydroxyl-containing monomeric units, pendant hydroxyl alkylether-containing monomeric units, pendant hydroxyl alkylester-containing monomeric units, pendant hydroxyl alkylamide-containing monomeric units, and mixtures thereof.

Crosslinking System

A crosslinking system comprising a crosslinking agent, such as an imidazolidinone, and optionally, a crosslinking facilitator, such as an ammonium salt, may be present in the polymer melt composition and/or may be added to the polymer melt composition before polymer processing of the polymer melt composition.

"Crosslinking agent" as used herein means any material that is capable of crosslinking a hydroxyl polymer within a polymer melt composition according to the present. Non-limiting examples of suitable crosslinking agents include polycarboxylic acids and/or imidazolidinones, such as dihydroxyethyleneurea (DHEU). In one example, the crosslinking agent is in the form of a solution rather than a recrystallized form. In another example, the crosslinking agent comprises less than 2% and/or less than 1.8% and/or less than 1.5% and/or less than 1.25% and/or 0% and/or to about 0.25% and/or to about 0.5% by weight of a base, such as triethanolamine.

"Crosslinking facilitator" as used herein means any material that is capable of activating a crosslinking agent thereby transforming the crosslinking agent from its unactivated state to its activated state.

Upon crosslinking the hydroxyl polymer during the curing step, the crosslinking agent becomes an integral part of the polymeric structure as a result of crosslinking the hydroxyl polymer as shown in the following schematic representation:

Hydroxyl polymer-Crosslinking agent-Hydroxyl polymer

The crosslinking facilitator may include derivatives of the material that may exist after the transformation/activation of the crosslinking agent. For example, a crosslinking facilitator salt being chemically changed to its acid form and vice versa.

Non-limiting examples of suitable crosslinking facilitators include acids having a pKa of less than 6 or salts thereof. The crosslinking facilitators may be Bronsted Acids and/or salts thereof, such as ammonium salts thereof.

In addition, metal salts, such as magnesium and zinc salts, can be used alone or in combination with Bronsted Acids and/or salts thereof, as crosslinking facilitators.

Non-limiting examples of suitable crosslinking facilitators include benzoic acid, citric acid, formic acid, glycolic acid, lactic acid, maleic acid, phthalic acid, phosphoric acid, hypophosphoric acid, succinic acid, and mixtures thereof and/or their salts, such as their ammonium salts, such as ammonium glycolate, ammonium citrate, ammonium chloride, ammonium sulfate.

Additional non-limiting examples of suitable crosslinking facilitators include glyoxal bisulfate salts, primary amine salts, such as hydroxyethyl ammonium salts, hydroxypropyl ammonium salt, secondary amine salts, ammonium toluene sulfonate, ammonium benzene sulfonate, ammonium xylene sulfonate, magnesium chloride, and zinc chloride.

Surfactants

The polymer melt compositions of the present invention and/or fibrous elements of the present invention and fibrous structures formed therefrom may comprise one or more surfactants. In one example, the surfactant is a fast wetting surfactant. In another example, the surfactant comprises a non-fast wetting surfactant, such as Aerosol® OT from Cytec.

Non-limiting examples of suitable fast wetting surfactants include surfactants that exhibit a twin-tailed general structure, for example a surfactant that exhibits a structure VIIA or VIIB as follows.

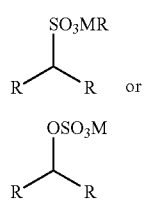

Structure VIIA

Structure VIIB wherein R is independently selected from substituted or unsubstituted, linear or branched aliphatic groups and mixtures thereof. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof and M is a suitable cation, such as an alkali metal cation and/or an ammonium cation. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure VIII.

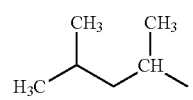

Structure VIII

In another example, R is independently selected from substituted or unsubstituted, linear or branched $C_5$ alkyls and mixtures thereof. In yet another example, R is independently selected from unsubstituted, linear $C_5$ alkyls and mixtures thereof. The $C_5$ alkyl may comprise a mixture of unsubstituted linear $C_5$ alkyls, for example $C_5$ n-pentyl, and/or 1-methyl branched $C_5$ alkyls as shown in the following structure IX.

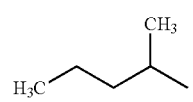

Structure IX

In even another example, R comprises a mixture of $C_4$-$C_7$ alkyls and/or a mixture of $C_5$-$C_6$ alkyls.

The fast wetting surfactants may be present in the polymer melt compositions, fibrous elements, and/or fibrous structures of the present invention, alone or in combination with other non-fast wetting surfactants.

In one example, the fast wetting surfactants of the present invention may be used individually or in mixtures with each other or in a mixture with one or more non-fast wetting surfactants, for example a $C_8$ sulfosuccinate surfactant where R is the following structure X

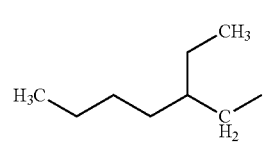

Structure X

In one example a fast wetting surfactant comprises a sulfosuccinate surfactant having the following structure XI.

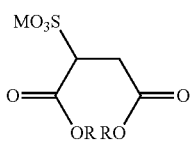

Structure XI wherein R is independently selected from substituted or unsubstituted, linear or branched aliphatic groups and mixtures thereof and M is a suitable cation, such as an alkali metal cation and/or an ammonium cation. In one example, R is independently selected from substituted or unsubstituted, linear or branched $C_4$-$C_7$ aliphatic chains and mixtures thereof. In another example, R is independently selected from substituted or unsubstituted, linear or branched $C_4$-$C_7$ alkyls and mixtures thereof. In another example, R is independently selected from substituted or unsubstituted, linear or branched $C_5$-$C_6$ alkyls and mixtures thereof. In still another example, R is independently selected from substituted or unsubstituted, linear or branched $C_6$ alkyls and mixtures thereof. In even another example, R is an unsubstituted, branched $C_6$ alkyl having the following structure XII.

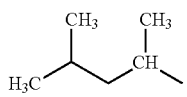

Structure XII

Non-limiting examples of fast wetting surfactants according to the present invention include sulfosuccinate surfactants, for example a sulfosuccinate surfactant that has structure VIII as its R groups (Aerosol® MA-80), a sulfosuccinate surfactant that has $C_4$ isobutyl as its R groups (Aerosol® IB), and a sulfosuccinate surfactant that has a mixture of $C_5$ n-pentyl and structure IX as its R groups (Aerosol® AY), all commercially available from Cytec.

Additional non-limiting examples of fast wetting surfactants according to the present invention include alcohol sulfates derived from branched alcohols such as Isalchem and Lial alcohols (from Sasol) ie. Dacpon 27 23 AS and Guerbet alcohols from Lucky Chemical. Still another example of a fast wetting surfactant includes paraffin sulfonates such as Hostapur SAS30 from Clariant.

Typically, the fast wetting surfactants are present in an amount of from about 0.01% to about 5% and/or from about 0.5% to about 2.5% and/or from about 1% to about 2% and/or from about 1% to about 1.5%, by weight of the polymer melt composition, fibrous element and/or fibrous structure.

A fast wetting surfactant may be present both in the interior and exterior of the fibrous elements produced from the polymer melt composition, which is distinguished from a surface only treatment of the formed fibrous elements. Any fast wetting surfactant that is present on the exterior of a fibrous element may be determined by extracting the fibrous element with a solvent that dissolves the surfactant, but does not swell the fibrous element and then analyzing for the surfactant by LC-mass spec. The surfactant that is present in the interior of the fibrous element may be determined by extracting the fibrous element with a solvent that dissolves the surfactant and also swells the fibrous elements, such as water/alcohol or water/acetone mixtures followed by analysis for surfactant by a technique such as LC mass spec. Alternatively, the fibrous element may be treated with an enzyme such as amylase that degrades the fibrous element-forming polymer, for example polysaccharide, but not the fast wetting surfactant and the resulting solution may be analyzed for the surfactant by LC-mass spec.

Hueing Agents

The polymer melt compositions and/or fibrous elements of the present invention may comprise one or more hueing agents. In one example, the total level of one or more hueing agents present within one or more, for example a plurality, of the fibrous elements of a fibrous structure of the present invention is less than 1% and/or less than 0.5% and/or less than 0.05% and/or less than 0.005% and/or greater than 0.00001% and/or greater than 0.0001% and/or greater than 0.001% by weight of the dry fibrous element and/or dry fibrous structure formed by fibrous elements containing the hueing agents. In one example, the total level of one or more hueing agents present within one or more, for example a plurality, of the fibrous elements of a fibrous structure of the present invention is from about 0.0001% to about 0.5% and/or from about 0.0005% to about 0.05% and/or from about 0.001% to about 0.05% and/or from about 0.001% to about 0.005% by weight of the dry fibrous element and/or dry fibrous structure formed by fibrous elements containing the hueing agents.

Hueing agents can be used either alone or in combination. Hueing agents may be selected from any known chemical class of dye, including but not limited to acridine, anthraquinone (including polycyclic quinones), azine, azo (e.g., monoazo, disazo, trisazo, tetrakisazo, polyazo), including premetallized azo, benzodifurane and benzodifuranone, carotenoid, coumarin, cyanine, diazahemicyanine, diphenylmethane, formazan, hemicyanine, indigoids, methane, naphthalimides, naphthoquinone, nitro and nitroso, oxazine, phthalocyanine, pyrazoles, stilbene, styryl, triarylmethane, triphenylmethane, xanthenes and mixtures thereof.

Non-limiting examples of hueing agents include dyes, dye-clay conjugates, and organic and inorganic pigments and mixtures thereof. Suitable dyes include small molecule dyes and polymeric dyes. Suitable small molecule dyes include small molecule dyes selected from the group consisting of dyes falling into the Colour Index (C.I.) classifications of Direct, Basic, Reactive or hydrolyzed Reactive, Solvent or Disperse dyes for example that are classified as Blue, Violet, Red, Green or Black, and mixtures thereof. In another aspect, suitable small molecule dyes include small molecule dyes selected from the group consisting of Colour Index (Society of Dyers and Colourists, Bradford, UK) numbers Direct Violet dyes such as 9, 35, 48, 51, 66, and 99, Direct Blue dyes such as 1, 71, 80 and 279, Acid Red dyes such as 17, 73, 52, 88 and 150, Acid Violet dyes such as 15, 17, 24, 43, 49 and 50, Acid Blue dyes such as 15, 17, 25, 29, 40, 45, 75, 80, 83, 90 and 113, Acid Black dyes such as 1, Basic Violet dyes such as 1, 3, 4, 10 and 35, Basic Blue dyes such as 3, 16, 22, 47, 66, 75 and 159, Disperse or Solvent dyes such as those described in US 2008/034511 A1 or U.S. Pat. No. 8,268,016 B2, or dyes as disclosed in U.S. Pat. No. 7,208,459 B2, and mixtures thereof. In another aspect, suitable small molecule dyes include small molecule dyes selected from the group consisting of C.I. Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing covalently bound (sometimes referred to as conjugated) chromogens, (dye-polymer conjugates), for example polymers with chromogens co-polymerized into the backbone of the polymer and mixtures thereof. Polymeric dyes include those described in WO2011/98355, US 2012/225803 A1, US 2012/090102 A1, U.S. Pat. No. 7,686,892 B2, and WO2010/142503.

In another aspect, suitable polymeric dyes include polymeric dyes selected from the group consisting of hueing agents commercially available under the trade name of Liquitint® (Milliken, Spartanburg, South Carolina, USA), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) covalently bound to a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colourants, alkoxylated thiophene polymeric colourants, and mixtures thereof.

Polymer Melt Composition

The polymer melt composition, for example an aqueous polymer melt composition such as an aqueous hydroxyl polymer melt composition, of the present invention comprises a melt processed fibrous element-forming polymer, such as a melt processed hydroxyl polymer, and a fast wetting surfactant according to the present invention.

The polymer melt compositions may already be formed or a melt processing step may need to be performed to convert a raw material fibrous element-forming polymer, such as a hydroxyl polymer, into a melt processed fibrous element-forming polymer, such as a melt processed hydroxyl polymer, thus producing the polymer melt composition. Any suitable melt processing step known in the art may be used to convert the raw material fibrous element-forming polymer into the melt processed fibrous element-forming polymer. "Melt processing" as used herein means any operation and/or process by which a polymer is softened to such a degree that it can be brought into a flowable state.

The polymer melt compositions may have a temperature of from about 50° C. to about 100° C. and/or from about 65° C. to about 95° C. and/or from about 70° C. to about 90° C. when spinning fibrous elements from the polymer melt compositions.

In one example, the polymer melt composition of the present invention may comprise from about 30% and/or from about 40% and/or from about 45% and/or from about 50% to about 75% and/or to about 80% and/or to about 85% and/or to about 90% and/or to about 95% and/or to about 99.5% by weight of the polymer melt composition of a fibrous element-forming polymer, such as a hydroxyl polymer. The fibrous element-forming polymer, such as a hydroxyl polymer, may have a weight average molecular weight greater than 100,000 g/mol In one example, the fibrous elements of the present invention produced via a polymer processing operation may be cured at a curing temperature of from about 110° C. to about 260° C. and/or from about 110° C. to about 230° C. and/or from about 120° C. to about 200° C. and/or from about 130° C. to about 185° C. for a time period of from about 0.01 and/or 1 and/or 5 and/or 15 seconds to about 60 minutes and/or from about 20 seconds to about 45 minutes and/or from about 30 seconds to about 30 minutes. Alternative curing methods may include radiation methods such as UV, e-beam, IR and other temperature-raising methods.

Further, the fibrous elements may also be cured at room temperature for days, either after curing at above room temperature or instead of curing at above room temperature.

The fibrous elements of the present invention may include melt spun fibers and/or spunbond fibers, staple fibers, hollow fibers, shaped fibers, such as multi-lobal fibers and multi-component fibers, especially bicomponent fibers. The multicomponent fibers, especially bicomponent fibers, may be in a side-by-side, sheath-core, segmented pie, ribbon, islands-in-the-sea configuration, or any combination thereof. The sheath may be continuous or non-continuous around the core. The ratio of the weight of the sheath to the core can be from about 5:95 to about 95:5. The fibers of the present invention may have different geometries that include round, elliptical, star shaped, rectangular, and other various eccentricities.

In one example, the fibrous structures of the present invention comprise a plurality of fibrous elements, for example hydroxyl polymer filaments comprising a hydroxyl polymer such as a crosslinked hydroxyl polymer. In another example, the fibrous structures may comprise starch and/or starch derivative filaments. The starch filaments may further comprise polyvinyl alcohol and/or other polymers.

Non-Limiting Example of a Fibrous Structure

A polymer melt composition comprising 79% IPG starch commercially available from Ingredion Inc., 16% Ethylex 2035 (ethoxylated starch) commercially available from Tate & Lyle PLC, 0.6% Aerosol AOT-70PG (sulfosuccinate surfactant) available from Cytec Industries, Inc., 0.6% Hyperfloc NF301PWG (non-hydroxyl polymer), commercially available from Hychem Inc., 3.1% Urea glyoxal adduct crosslinking agent (dihydroxyethyleneurea) (containing less than 2% by weight of a base, for example triethanolamine), 0.003% Violet CT (hueing agent) commercially available from Milliken Chemical, and 0.7% Ammonium methane sulfonate (crosslinking facilitator). The polymer melt composition is cooked at approximately 125° C. and extruded from a co-rotating twin screw extruder at approx 50% solids (50% $H_2O$). The melt composition then passes through a heat exchanger to raise the temperature to approximately 175° C. The heated melt then passes to a flash extruder where water is flashed off and the melt cooled back to approximately 70° C.

The melt composition is then pumped to a meltblown spinnerette (meltblow die) and attenuated with a 65° C. saturated air stream to form a nonwoven substrate having a basis weight of from about 2 $g/m^2$ to about 25 $g/m^2$. The filaments are then dried by convection drying before being deposited on a first web material (a pre-formed cellulosic web) to form a fibrous structure according to the present invention. The meltblown filaments in the fibrous structure are essentially continuous filaments.

The first web material (pre-formed cellulosic web) of the fibrous structure has a basis weight of from about 10 gsm to about 50 gsm. It is produced from a wet laid papermaking process commonly known in the art. The cellulosic web can be made creped or uncreped, patterned or unpatterned.

The fibrous structure is then subjected to a thermal bonding process wherein the thermal bond sites are formed with heat and pressure.

The thermally bonded fibrous structure then undergoes a curing/crosslinking step by applying heat to the thermally bonded fibrous structure such that the thermally bonded fibrous structure reaches a temperature of about 200° C. for a sufficient time for sufficient crosslinking of the crosslinking agent in the filaments to occur.

The fibrous structure is then humidified to approximately 7-10 wt % moisture and rewound into a parent roll.

The single ply parent roll is then converted into a sanitary tissue product with perforations and an emboss pattern. Alternatively two parent rolls may be used to convert into a 2 ply sanitary tissue product.

Test Methods

Unless otherwise specified, all tests described herein including those described under the Definitions section and the following test methods are conducted on samples that have been conditioned in a conditioned room at a temperature of 23° C.±1.0° C. and a relative humidity of 50%±2% for a minimum of 24 hours prior to the test. All plastic and paper board packaging articles of manufacture, if any, must be carefully removed from the samples prior to testing. The samples tested are "usable units." "Usable units" as used herein means sheets, flats from roll stock, pre-converted flats, fibrous structure, and/or single or multi-ply products. Except where noted all tests are conducted in such conditioned room, all tests are conducted under the same environmental conditions and in such conditioned room. Discard any damaged product. Do not test samples that have defects such as wrinkles, tears, holes, and like. All instruments are calibrated according to manufacturer's specifications.

Basis Weight Test Method

Basis weight of a fibrous structure is measured on stacks of twelve usable units using a top loading analytical balance with a resolution of ±0.001 g. The balance is protected from air drafts and other disturbances using a draft shield. A precision cutting die, measuring 8.890 cm±0.00889 cm by 8.890 cm±0.00889 cm is used to prepare all samples.

With a precision cutting die, cut the samples into squares. Combine the cut squares to form a stack twelve samples thick. Measure the mass of the sample stack and record the result to the nearest 0.001 g.

The Basis Weight is calculated in g/m² as follows:

Basis Weight=(Mass of stack)/[(Area of 1 square in stack)×(No. of squares in stack)]

Basis Weight (g/m²)=Mass of stack (g)/[79.032 (cm²)/10,000 (cm²/m²)×12]

Report result to the nearest 0.1 g/m². Sample dimensions can be changed or varied using a similar precision cutter as mentioned above, so as at least 645 square centimeters of sample area is in the stack.

Average Diameter Test Method

This Average Diameter Test Method is used to determine the average diameters of fibrous elements, such as filaments and/or fibers, where their known average diameters are not already known. For example, average diameters of commercially available fibers, such as rayon fibers, have known lengths whereas average diameters of spun filaments, such as spun hydroxyl polymer filaments, would be determined as set forth immediately below. Further, pulp fibers, such as wood pulp fibers, especially commercially available wood pulp fibers would have known diameter (width) from the supplier of the wood pulp or are generally known in the industry and/or can ultimately be measured according to the Kajaani FiberLab Fiber Analyzer SubTest Method described below.

A fibrous structure comprising filaments of appropriate basis weight (approximately 5 to 20 grams/square meter) is cut into a rectangular shape sample, approximately 20 mm by 35 mm. The sample is then coated using a SEM sputter coater (EMS Inc, PA, USA) with gold so as to make the filaments relatively opaque. Typical coating thickness is between 50 and 250 nm. The sample is then mounted between two standard microscope slides and compressed together using small binder clips. The sample is imaged using a 10× objective on an Olympus BHS microscope with the microscope light-collimating lens moved as far from the objective lens as possible. Images are captured using a Nikon D1 digital camera. A Glass microscope micrometer is used to calibrate the spatial distances of the images. The approximate resolution of the images is 1 μm/pixel. Images will typically show a distinct bimodal distribution in the intensity histogram corresponding to the filaments and the background. Camera adjustments or different basis weights are used to achieve an acceptable bimodal distribution. Typically 10 images per sample are taken and the image analysis results averaged.

The images are analyzed in a similar manner to that described by B. Pourdeyhimi, R. and R. Dent in "Measuring fiber diameter distribution in nonwovens" (Textile Res. J. 69(4) 233-236, 1999). Digital images are analyzed by computer using the MATLAB (Version. 6.1) and the MATLAB Image Processing Tool Box (Version 3.) The image is first converted into a grayscale. The image is then binarized into black and white pixels using a threshold value that minimizes the intraclass variance of the thresholded black and white pixels. Once the image has been binarized, the image is skeltonized to locate the center of each fiber in the image. The distance transform of the binarized image is also computed. The scalar product of the skeltonized image and the distance map provides an image whose pixel intensity is either zero or the radius of the fiber at that location. Pixels within one radius of the junction between two overlapping fibers are not counted if the distance they represent is smaller than the radius of the junction. The remaining pixels are then used to compute a length-weighted histogram of filament diameters contained in the image.

Kajaani FiberLab Fiber Analyzer SubTest Method

Instrument Start-Up:
1. Turn on Kajaani FiberLab Fiber Analyzer unit first, then computer and monitor.
2. Start FiberLab program on computer.

Instrument Operation:
1. File→New (or click on New File icon)
2. "New Fiber Analysis" screen pops up.
   a. Sample Point: select the folder you would like data stored in (to add a new folder see "Adding a New Folder"
   b. Name: add condition or sample name/identifier here
   c. Date
   d. Time
   e. Sample Weight: mg of dry fiber in the 50 ml sample (can leave blank if NOT measuring for coarseness). This is the number calculated in #10 of Sample Prep below.
3. Make sure 50 ml of sample is placed in a "Kajaani beaker" and click "Start"
4. Optional: Distribution→Measured Values
   a. Fibers: the final count of measured fibers should be at least 10,000
   b. Fibers/sec: this number must stay below 70 fibers/sec or the sample will automatically be diluted. If the sample is diluted during an analysis, the coarseness value will be invalid and will need to be discarded.
5. A bar indicating the measurement status of a sample appears on the computer monitor. Do not start an analysis until the indicated status is "Wait State". When the analysis is completed, wait for "Wait State" to appear, then close the "New Fiber Analysis" window. You can now repeat #1-¾

6. When finished with all samples, close the FiberLab program before turning off the Kajaani FiberLab analyzer unit.
7. Shutdown computer.

Sample Preparation:
Target Sample Size:
Softwood: 4 mg/50 ml→160 mg BD in 2000 ml (~170-175 mg from sheet)
Hardwood: 1 mg/50 ml→40 mg BD in 2000 ml (~40-45 mg from sheet)

1. For n=3 analysis, weigh and record weight of sample torn (avoiding cut edges) from 3 different pulp sheets of same sample using guidelines above for sample size. Place weighed samples into a suitable container for soaking of pulp.
2. Using the 3 sheets that samples were torn from, perform moisture content analysis. Note: This step can be skipped if coarseness measurement is not required.
3. Calculate the actual bone dry weight of the samples weighed in #1, by using the average moisture determined in #2.
4. Allow pulp samples to soak in water for 10-15 minutes.
5. Place $1^{st}$ sample and soaking water into the Kajaani manual disintegrator. Fill disintegrator up to 250 ml mark with more water.
6. Using the "hand dasher", plunge up and down until sample is separated into individual fibers.
7. Transfer sample to a 2000 ml volumetric flask. Make sure to wash off and collect any fibers that may have adhered to the dasher.
8. Dilute up to 2000 ml mark. It is important to be as precise as possible for repeatable coarseness results.
9. Take a 50 ml aliquot and place into a Kajaani beaker. Place beaker on the sampler unit.
10. Calculate the mg of BD pulp in 50 ml aliquot
    a. (BD mg of sample/2000 ml)×50 ml
11. Begin Step #1 above in Instrument Operation The water used in this method is City of Cincinnati Water or equivalent having the following properties: Total Hardness=155 mg/L as $CaCO_3$; Calcium content=33.2 mg/L; Magnesium content=17.5 mg/L; Phosphate content=0.0462

Adding a New Folder to Sample Point Menu:
1. Settings→Common Settings→Sample Folders
    a. Type in name of new folder→Add→OK
Note: You must close the FiberLab program and re-open program to see the new folder appear in the menu.

Collecting Data in Excel File:
1. Start FiberLab's Collect 1.12 program.
2. Open Windows Explorer (not to full screen—you must be able to see both the Explorer and the Collect windows.
3. In Windows Explorer . . . Select folder that data was stored in
4. Highlight data to be put in Excel→right click on Copy→drag highlighted samples to the Collect window→Save text
5. Click "Save In" menu bar and select "My briefcase". Open the 2007 folder, type in file name and click Save. A message will appear saying the selected samples have been saved. Click OK (the sample names will disappear from the Collect window.
6. Open Excel. Then . . . Open→Look In "My Briefcase"→2007→at bottom, select "All Files (*.*)" in the "Files of Type" bar→find text file just saved and open→click thru the Text Import Wizard screens (next, next, finish)

Emtec Test Method

TS7 and TS750 values are measured using an EMTEC Tissue Softness Analyzer ("Emtec TSA") (Emtec Electronic GmbH, Leipzig, Germany) interfaced with a computer running Emtec TSA software (version 3.19 or equivalent). According to Emtec, the TS7 value correlates with the real material softness, while the TS750 value correlates with the felt smoothness/roughness of the material. The Emtec TSA comprises a rotor with vertical blades which rotate on the test sample at a defined and calibrated rotational speed (set by manufacturer) and contact force of 100 mN. Contact between the vertical blades and the test piece creates vibrations, which create sound that is recorded by a microphone within the instrument. The recorded sound file is then analyzed by the Emtec TSA software. The sample preparation, instrument operation and testing procedures are performed according the instrument manufacture's specifications.

Sample Preparation

Test samples are prepared by cutting square or circular samples from a finished product. Test samples are cut to a length and width (or diameter if circular) of no less than about 90 mm, and no greater than about 120 mm, in any of these dimensions, to ensure the sample can be clamped into the TSA instrument properly. Test samples are selected to avoid perforations, creases or folds within the testing region. Prepare 8 substantially similar replicate samples for testing. Equilibrate all samples at TAPPI standard temperature and relative humidity conditions (23° C.±2° C.° and 50%±2%) for at least 1 hour prior to conducting the TSA testing, which is also conducted under TAPPI conditions.

Testing Procedure

Calibrate the instrument according to the manufacturer's instructions using the 1-point calibration method with Emtec reference standards ("ref.2 samples"). If these reference samples are no longer available, use the appropriate reference samples provided by the manufacturer. Calibrate the instrument according to the manufacturer's recommendation and instruction, so that the results will be comparable to those obtained when using the 1-point calibration method with Emtec reference standards ("ref.2 samples").

Mount the test sample into the instrument, and perform the test according to the manufacturer's instructions. When complete, the software displays values for TS7 and TS750. Record each of these values to the nearest 0.01 dB $V^2$ rms. The test piece is then removed from the instrument and discarded. This testing is performed individually on the top surface (outer facing surface of a rolled product) of four of the replicate samples, and on the bottom surface (inner facing surface of a rolled product) of the other four replicate samples.

The four test result values for TS7 and TS750 from the top surface are averaged (using a simple numerical average); the same is done for the four test result values for TS7 and TS750 from the bottom surface. Report the individual average values of TS7 and TS750 for both the top and bottom surfaces on a particular test sample to the nearest 0.01 dB $V^2$ rms. Additionally, average together all eight test value results for TS7 and TS750, and report the overall average values for TS7 and TS750 on a particular test sample to the nearest 0.01 dB $V^2$ rms.

Micro-CT Test Method (Micro-CT Intenstive Property Measurement Test Method)

The micro-CT test method is based on analysis of a 3D x-ray sample image obtained on a micro-CT instrument (a suitable instrument is the Scanco μCT 50 available from Scanco Medical AG, Switzerland, or equivalent). The micro-CT instrument is a cone beam microtomograph with a shielded cabinet. A maintenance free x-ray tube is used as the source with an adjustable diameter focal spot. The x-ray beam passes through the sample, where some of the x-rays are attenuated by the sample. The extent of attenuation correlates to the mass of material the x-rays have to pass through. The transmitted x-rays continue on to the digital detector array and generate a 2D projection image of the sample. A 3D image of the sample is generated by collecting several individual projection images of the sample as it is rotated, which are then reconstructed into a single 3D image. The instrument is interfaced with a computer running software to control the image acquisition and save the raw data. The 3D image is then analyzed using image analysis software (a suitable image analysis software is MATLAB available from The Mathworks, Inc., Natick, MA, or equivalent) to measure the basis weight, thickness and density intensive properties of regions within the sample.

a. Sample Preparation:

To obtain a sample for measurement, lay a single layer of the dry substrate material out flat and die cut a circular piece with a diameter of 30 mm. If the substrate material is in the form of a wet wipe, open a new package of wet wipes and remove the entire stack from the package. Remove a single wipe from the middle of the stack, lay it out flat and allow it to dry completely prior to die cutting the sample for analysis. A sample may be cut from any location containing the region to be analyzed. A region to be analyzed is one where there are visually discernible changes in texture, elevation, or thickness. Regions within different samples taken from the same substrate material can be analyzed and compared to each other. Care should be taken to avoid folds, wrinkles or tears when selecting a location for sampling.

b. Image Acquisition:

Set up and calibrate the micro-CT instrument according to the manufacturer's specifications. Place the sample into the appropriate holder, between two rings of low density material, which have an inner diameter of 25 mm. This will allow the central portion of the sample to lay horizontal and be scanned without having any other materials directly adjacent to its upper and lower surfaces. Measurements should be taken in this region. The 3D image field of view is approximately 35 mm on each side in the xy-plane with a resolution of approximately 2 μm, and with a sufficient number of 10 micron thick slices collected to fully include the z-direction of the sample. The reconstructed 3D image resolution contains isotropic voxels of 10 microns. Images are acquired with the source at 45 kVp and 200 μA with no additional low energy filter. These current and voltage settings may be optimized to produce the maximum contrast in the projection data with sufficient x-ray penetration through the sample, but once optimized held constant for all substantially similar samples. A total of 1500 projections images are obtained with an integration time of 1000 ms and 3 averages. The projection images are reconstructed into the 3D image, and saved in 16-bit RAW format to preserve the full detector output signal for analysis.

CRT Test Method

The absorption (wicking) of water by an absorbent fibrous structure (sample) is measured over time. A sample is placed horizontally in the instrument and is supported by an open weave net structure that rests on a balance. The test is initiated when a tube connected to a water reservoir is raised and the meniscus makes contact with the center of the sample from beneath, at a small negative pressure. Absorption is allowed to occur for 2 seconds after which the contact is broken and the cumulative rate for the first 2 seconds is calculated.

Apparatus

Conditioned Room—Temperature is controlled from 73° F.±2° F. (23° C.±1° C.). Relative Humidity is controlled from 50%±2%

Sample Preparation—Product samples are cut using hydraulic/pneumatic precision cutter into 3.375 inch diameter circles.

Capacity Rate Tester (CRT)—The CRT is an absorbency tester capable of measuring capacity and rate. The CRT consists of a balance (0.001 g), on which rests on a woven grid (using nylon monofilament line having a 0.014" diameter) placed over a small reservoir with a delivery tube in the center. This reservoir is filled by the action of solenoid valves, which help to connect the sample supply reservoir to an intermediate reservoir, the water level of which is monitored by an optical sensor. The CRT is run with a −2 mm water column, controlled by adjusting the height of water in the supply reservoir.

Software—LabView based custom software specific to CRT Version 4.2 or later.

Water—Distilled water with conductivity <10 μS/cm (target <5 μS/cm) @ 25° C.

For this method, a usable unit is described as one finished product unit regardless of the number of plies. Condition all samples with packaging materials removed for a minimum of 2 hours prior to testing. Discard at least the first ten usable units from the roll. Remove two usable units and cut one 3.375-inch circular sample from the center of each usable unit for a total of 2 replicates for each test result. Do not test samples with defects such as wrinkles, tears, holes, etc. Replace with another usable unit which is free of such defects Pre-Test Set-Up 1. The water height in the reservoir tank is set −2.0 mm below the top of the support rack (where the sample will be placed).
2. The supply tube (8 mm I.D.) is centered with respect to the support net.
3. Test samples are cut into circles of 3⅜" diameter and equilibrated at Tappi environment conditions for a minimum of 2 hours.

Test Description

1. After pressing the start button on the software application, the supply tube moves to 0.33 mm below the water height in the reserve tank. This creates a small meniscus of water above the supply tube to ensure test initiation. A valve between the tank and the supply tube closes, and the scale is zeroed.
2. The software prompts you to "load a sample". A sample is placed on the support net, centering it over the supply tube, and with the side facing the outside of the roll placed downward.
3. Close the balance windows, and press the "OK" button—the software records the dry weight of the circle.
4. The software prompts you to "place cover on sample". The plastic cover is placed on top of the sample, on top of the support net. The plastic cover has a center pin (which is flush with the outside rim) to ensure that the sample is in the proper position to establish hydraulic connection. Four other pins, 1 mm shorter in depth, are positioned 1.25-1.5 inches radially away from the center pin to ensure the sample is flat during the test. The sample cover rim should not contact the sheet. Close the top balance window and click "OK".

5. The software re-zeroes the scale and then moves the supply tube towards the sample. When the supply tube reaches its destination, which is 0.33 mm below the support net, the valve opens (i.e., the valve between the reserve tank and the supply tube), and hydraulic connection is established between the supply tube and the sample. Data acquisition occurs at a rate of 5 Hz, and is started about 0.4 seconds before water contacts the sample.
6. The test runs for 2 seconds. After this, the supply tube pulls away from the sample to break the hydraulic connection.
7. The wet sample is removed from the support net. Residual water on the support net and cover are dried with a paper towel.
8. Repeat until all samples are tested.
9. After each test is run, a *.txt file is created (typically stored in the CRT/data/rate directory) with a file name as typed at the start of the test. The file contains all the test set-up parameters, dry sample weight, and cumulative water absorbed (g) vs. time (sec) data collected from the test.
10. Report the average cumulative 0-2 seconds rate to the nearest 0.001 g/second as the CRT Initial Rate.
11. The difference between a Control Sample and a Test Sample can be calculated from their respective CRT Initial Rates from Step 10 and then the percentage change can be determined and reported as CRT Initial Rate Change.

Glide on Skin Test Method

The Glide on Skin test method measures the Force to Drag and Force Variability of a custom probe having a textured surface, designed to mimic skin, as it dragged across the surface of a fibrous structure sample by a Friction/Peel tester.

Testing is performed on a Friction/Peel tester fitted with a custom probe, as shown in FIGS. 11A-11D. A suitable Friction/Peel tester is a Thwing-Albert Model 2260 Friction/Peel Tester (Thwing-Albert Instrument Company, 14 W. Collings Ave. West Berlin, NJ 08091), or equivalent. A 2000 gram capacity load cell 102 is used, accurate to ±0.25% of the measuring value, along with a cross-head arm 104 accurate to ±0.01% per inch of travel distance.

The instrument must be located in and all testing performed in a conditioned room maintained at 23° C.±2° C.° and 50%±2% relative humidity.

Figure 11A:
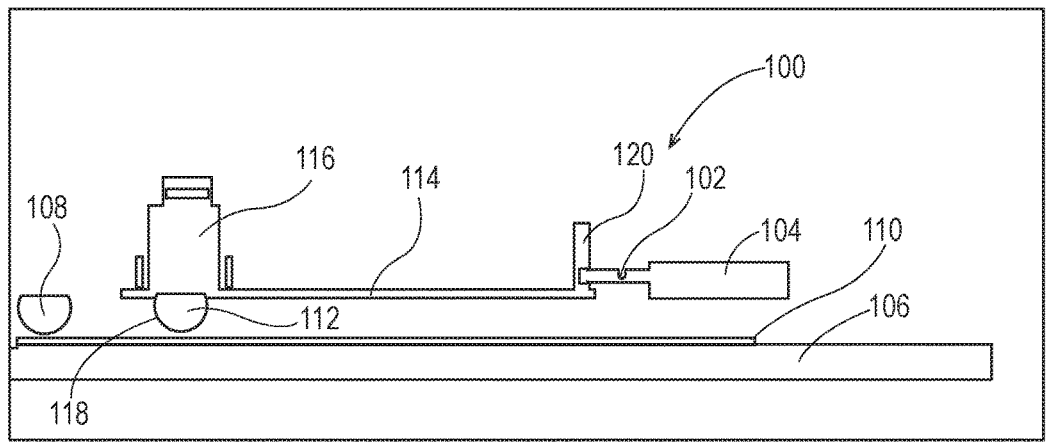
FIG. 11A is a schematic representation of a Glide on Skin Test Method set-up.
Figure 11B:
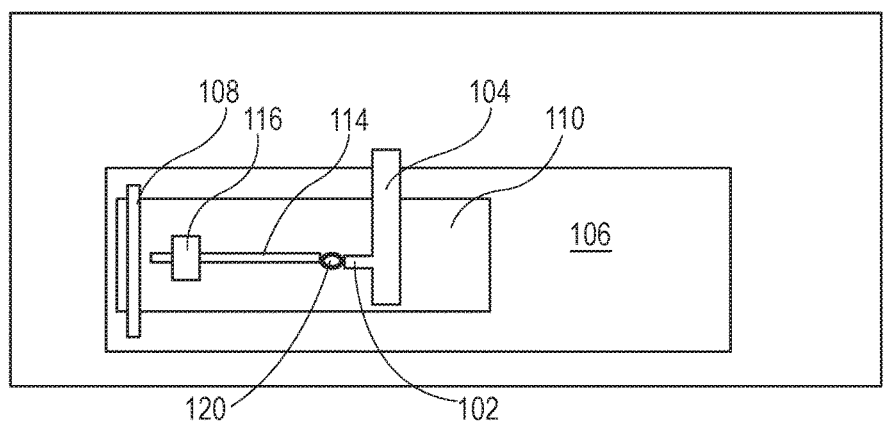
FIG. 11B is a schematic top view representation of FIG. 11A.
Figure 11C:
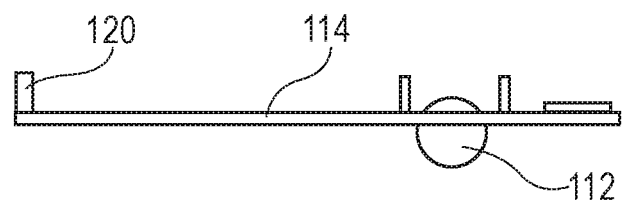
FIG. 11C is a schematic representation of a Probe used in FIG. 11A.
Figure 11D:
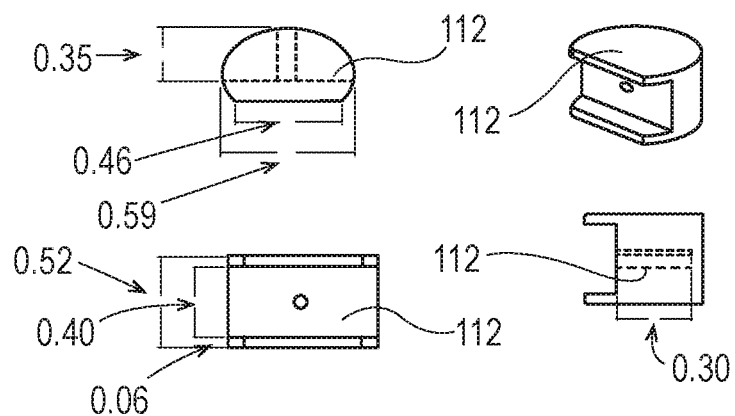
FIG. 11D are different views of the sled used in FIG. 11A.

The sample platform 106 is horizontally level, 20 inches (50.8 cm) long, by 6 inches (15.24 cm) wide and has a sample clamp 108 on one end to secure the fibrous structure sample 110 to be tested. Referring to FIG. 11D, the probe 112 is manufactured from a cylindrical aluminum rod 13.2±0.2 mm in length, 15.0±0.2 mm in diameter. A round side of the aluminum rod is milled flat to facilitate attachment to an aluminum arm 114. The rounded testing surface of the probe has a custom textured surface applied to it 118, which is designed to mimic skin. The appropriate surface texture is a coating by the name "Plasma 11000 Series® PC-11015 (coating thickness 0.003/0.005 inches)", which is applied by American Roller Company Plasma Coatings from Arlington, TN Referring to FIG. 11C, the probe 112 is attached near the end of the aluminum arm 114, approximately 13 cm in length, with the probe's long axis attached perpendicular to the long axis of the arm 114. A probe pin 120 is attached to the end of the arm opposite the probe.

The instrument 100 is turned on at least 30 minutes prior to initiating testing, and is calibrated and operated according to the manufacturer's instructions. The instrument is interfaced with a computer running the appropriate software to operate the instrument. Program the instrument to move the cross-head arm 104 at a constant speed of 1.0 mm/sec for 40 cm, while collecting force and position data at an acquisition rate of 250 Hz.

The probe 112 with the skin mimic surface 118 is attached to the load cell 102 and cross-head arm assembly by inserting the probe pin 120 into an attachment hole in the load cell 102. A small level is placed on the probe arm, and the load cell 102 and cross-head arm 104 assembly is raised or lowered so that the probe arm is level and parallel to the sample platform 106. The load cell 102 and cross-head arm 104 assembly is positioned so that the trailing edge of the probe 112 is located approximately 5 mm away from the sample clamp 108 and zeroed at this position. A weighted vial 116, which will be placed on the probe during testing, is prepared by adding lead shot to the small plastic vial such that the total weight of the probe, arm, and weighted vial is 100±0.1 grams.

A fibrous structure sample 110 is prepared by cutting a 15 cm by 10 cm rectangular sample from a finished product. Test samples are selected to avoid perforations, creases or folds within the testing region. Prepare ten (10) substantially similar replicate samples for testing. All fibrous structure samples 110 being tested are equilibrated in a controlled environment (23° C.±2° C.° and 50%±2% RH) for at least 2 hours before testing.

The fibrous structure sample 110 is laid directly on the sample platform 106 so that a short end of the fibrous structure 110 test sample is under the sample clamp 108 and the fibrous structure sample 110 lies flat on the sample platform 106. The fibrous structure sample 110 is positioned so that the region to be tested does not include a perforation. All testing is to be performed in the machine direction of the fibrous structure sample. The clamp 108 is lowered to prevent the fibrous structure sample 110 from moving during testing.

To prepare the probe for testing, an alcohol wipe is used to wipe down the surface of the skin mimic 118 to remove any dust/oils/or debris. Set the probe aside in a manner that ensures the skin mimic 118 surface does not touch anything prior to testing. If the skin mimic 118 surface is worn or damaged replace it prior to testing. The skin mimic 118 surface is allowed to fully dry before being used for testing. The probe 112 is carefully placed on the fibrous structure sample 110, and the probe pin 120 is inserted through the attachment hole in the load cell 102, such that the probe and arm are properly aligned to be parallel with the testing path. The weighted vial 116 containing lead shot is carefully placed on the arm 114, positioned such that it is centered directly over the probe 112. The load cell 102 is zeroed.

The testing procedure is initiated so that the probe 112 is dragged by the cross-head arm 104 at a speed of 1.0 mm/sec over the surface of the fibrous structure sample 110 in the machine direction for a distance of 40 mm, while force and displaced distance readings are collected at a rate of 250 data points/sec.

This measurement procedure is repeated on the ten substantially similar replicate fibrous structure samples 110, such that ten individual force versus distance profiles are generated.

A test is considered invalid, and the data discarded if one or more of the following occurs during testing: The probe detaches from the load cell. The weighted vial falls off of the probe. The probe passes over a perforation in the fibrous structure sample. The fibrous structure sample rips, buckles, delaminates, or detaches from the clamp.

The Force to Drag value is calculated as the mean of the individual force data points collected between a distance of 5 mm and 35 mm, excluding data from the first 5 mm and the last 5 mm of the total 40 mm distance. The Force to Drag value is the average of the ten individual replicate values and is reported to the nearest 0.1 grams force.

The Force Variability value is calculated as the mean of the absolute value difference of each individual force data point from its local mean (mean absolute deviation from the local mean) between a distance of 5 mm and 35 mm, again excluding the first 5 mm and the last 5 mm of the total 40 mm distance. The local mean is calculated using a moving average of the force data within ±2.5% of the total data field from each individual data point. For example, using the data rate of 250 points/sec and cross-head arm speed of 1 mm/sec over a 30 mm distance (40 mm-2×5 mm), 7500 data points are collected during a test, so 2.5% of 7500 yields 188 pts. The moving average of the force data within a range of ±188 data points of each individual data point is then used as the local mean for that point. The average of the absolute value difference of each individual data point from its local mean yields the Force Variability value for that test. The Force Variability value is the average of the ten individual replicate values and is reported to the nearest 0.1 grams force.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A dry multi-ply toilet tissue comprising:
    1) A first ply comprising a layered, dispersible fibrous structure comprising:
        a. a first exterior body contacting layer comprising 100% spun hydroxyl polymer fibrous elements by weight of the first exterior body contacting layer, wherein the first layer comprises a monoplanar surface; and
        b. a second layer comprising a first web material comprising a first wet laid fibrous structure ply formed from an embryonic web material of wood pulp fibers and about 65% to about 75% water, comprising a three-dimensional (3D) patterned fibrous structure comprising 100% wood pulp fibers and exhibits temporary wet strength, wherein the second layer comprises a multi-planar surface relative to the monoplanar surface of the first layer;
        wherein the spun hydroxyl polymer fibrous elements of the first layer are spun from a die and directly laid on top of and bonded to a surface of the 3D patterned fibrous structure and form a surface-deposited surface material on the surface of the 3D patterned fibrous structure; and wherein the surface-deposited surface material forms an exterior surface of the layered, dispersible fibrous structure; and
    2) A second ply comprising a second wet laid fibrous structure ply;
    wherein the dry multi-ply toilet tissue exhibits a Force Variability Value of less than 1.40 as measured according to the Glide on Skin Test Method;
    wherein the dry multi-ply toilet tissue exhibits a Force to Drag Value of less than 100 as measured according to the Glide on Skin Test Method;
    wherein the hydroxyl polymer fiber elements of the first ply first layer exhibit a length of 5.08 cm or greater and an average diameter less than 10 μm and the naturally occurring fibers of the first ply second layer exhibit a length of less than 5.08 cm and an average diameter greater than 12 μm;
    wherein the dry multi-ply toilet tissue comprises an exterior surface that is void of surface chemistry agents.

2. The dry multi-ply toilet tissue according to claim 1 wherein the spun hydroxyl polymer fibrous elements of the first layer exhibit an average diameter of greater than 1 μm to less than 10 μm as measured according to the Average Diameter Test Method.

3. The dry multi-ply toilet tissue according to claim 2 wherein the spun hydroxyl polymer fibrous elements of the first layer exhibit an average diameter of greater than 3 μm to less than 10 μm as measured according to the Average Diameter Test Method.

4. The dry multi-ply toilet tissue according to claim 3 wherein the spun hydroxyl polymer fibrous elements of the first layer exhibit an average diameter of from 4 μm to 8 μm as measured according to the Average Diameter Test Method.

5. The dry multi-ply toilet tissue according to claim 1 wherein the hydroxyl polymer fibrous elements comprise polyvinyl alcohol.

6. The dry multi-ply toilet tissue according to claim 1 wherein the hydroxyl polymer fibrous elements comprise a polysaccharide.

7. The dry multi-ply toilet tissue according to claim 6 wherein the polysaccharide is selected from the group consisting of: cellulose, cellulose derivatives, starch, starch derivatives, hemicelluloses, hemicelluloses derivatives, and mixtures thereof.

8. The dry multi-ply toilet tissue according to claim 1 wherein spun hydroxyl polymer fibrous elements of the first layer comprise a crosslinked polymer.

9. The dry multi-ply toilet tissue according to claim 1 wherein the wood pulp fibers are selected from the group consisting of: southern softwood kraft pulp fibers, northern softwood kraft pulp fibers, and mixtures thereof.

10. The dry multi-ply toilet tissue according to claim 1 wherein the first wet laid fibrous structure ply is a through-air-dried fibrous structure ply.

11. The dry multi-ply toilet tissue according to claim 1 wherein at least one of the first wet laid fibrous structure ply and the second wet laid fibrous structure ply comprises a temporary wet strength agent.

12. The dry multi-ply toilet tissue according to claim 1 wherein at least one of the first wet laid fibrous structure ply and the second wet laid fibrous structure ply comprises a softening agent.

* * * * *